(12) United States Patent
Yuasa

(10) Patent No.: US 8,769,007 B2
(45) Date of Patent: Jul. 1, 2014

(54) CONTROL DEVICE AND METHOD, PROGRAM, AND RECORDING MEDIUM

(75) Inventor: Naoki Yuasa, Minato-ku (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 11/908,989

(22) PCT Filed: Apr. 12, 2006

(86) PCT No.: PCT/JP2006/307742
§ 371 (c)(1),
(2), (4) Date: Sep. 18, 2007

(87) PCT Pub. No.: WO2006/112326
PCT Pub. Date: Oct. 26, 2006

(65) Prior Publication Data
US 2009/0033806 A1    Feb. 5, 2009

(30) Foreign Application Priority Data

Apr. 18, 2005 (JP) .................... 2005-120001
May 18, 2005 (JP) .................... 2005-145398

(51) Int. Cl.
*G06F 15/16* (2006.01)
*H04B 1/06* (2006.01)
*G06F 3/041* (2006.01)

(52) U.S. Cl.
USPC ............... 709/204; 455/352; 345/173

(58) Field of Classification Search
USPC .................................. 709/208, 204, 223
See application file for complete search history.

(56) References Cited

U.S. PATENT DOCUMENTS

| 6,823,519 B1 * | 11/2004 | Baird et al. | 719/313 |
| 2001/0017615 A1 * | 8/2001 | Lin et al. | 345/173 |
| 2003/0107888 A1 * | 6/2003 | Devlin et al. | 362/233 |
| 2006/0089118 A1 * | 4/2006 | Whitehouse | 455/352 |

FOREIGN PATENT DOCUMENTS

| JP | 2002 149516 | 5/2002 |
| JP | 2003 143666 | 5/2003 |
| JP | 2004 110392 | 4/2004 |
| JP | 2004-180260 | 6/2004 |
| JP | 2004 343174 | 12/2004 |
| JP | 2005 20650 | 1/2005 |
| JP | 2005 31804 | 2/2005 |
| JP | 2005 50126 | 2/2005 |
| WO | 2004 010232 | 1/2004 |

OTHER PUBLICATIONS

Office Action issued Sep. 16, 2010, in Japan Patent Application No. 2005-145398.

* cited by examiner

*Primary Examiner* — Afshawn Towfighi
(74) *Attorney, Agent, or Firm* — Oblon, Spivak, McClelland, Maier & Neustadt, L.L.P.

(57) ABSTRACT

According to the present invention, a plurality of apparatuses can be synchronously controlled by a simpler operation. A synchronous control information management unit 87 stores synchronous control information including synchronous operation patterns and synchronous control conditions. In each of the synchronous operation patterns, a procedure for sequentially transmitting control commands to a plurality of apparatuses is defined using a single pattern name. In each of the synchronous control conditions, a condition for selecting one of the synchronous operation patterns is described. A control pattern analysis unit 89 analyzes a synchronous control pattern, sequentially generates control commands used to control apparatuses on the basis of the analysis result, and supplies the generated control commands to a network interface 81 or an infrared communication control unit 90. The present invention can be applied to a reproduction system for reproducing content.

16 Claims, 24 Drawing Sheets

| CONTENT ATTRIBUTE | PARAMETER USED FOR DETERMINATION (DETERMINATION BASED ON PROFILE INFORMATION ON SELECTED RENDERER) | REMARKS |
|---|---|---|
| RENDERER NAME | NAME OF SELECTED RENDERER EXAMPLE: LIVING ROOM TV, LIBRARY TV, OR BEDROOM COMPONENT | SPECIFY APPARATUSES TO BE SYNCHRONOUSLY CONTROLLED ON THE BASIS OF NAME OF SELECTED RENDERER |
| RENDERER LOCATION | LOCATION OF SELECTED RENDERER EXAMPLE: LIVING ROOM, BEDROOM, OR LIBRARY | SPECIFY APPARATUSES TO BE SYNCHRONOUSLY CONTROLLED ON THE BASIS OF LOCATION OF SELECTED RENDERER |

FIG. 24 (23-2)

CONTROL DEVICE AND METHOD, PROGRAM, AND RECORDING MEDIUM

CROSS-REFERENCE TO RELATED APPLICATIONS

This application claims the benefit of priority from the prior Japanese Patent Application No. 2005-120001, filed on Apr. 18, 2005, and the prior Japanese Patent Application No. 2005-145398, filed on May 18, 2005.

TECHNICAL FIELD

The present invention relates to control apparatuses, control methods, programs, and recording media, and, more particularly, to a control apparatus and a control method which are capable of synchronously controlling a plurality of apparatuses, a program, and a recording medium.

BACKGROUND ART

Currently, network-connectable AV (Audio Visual) apparatuses are becoming increasingly popular.

In order to instruct an apparatus (a renderer) connected to a network to display or reproduce content, a user generally operates a controller so as to cause the controller to transmit an instruction for displaying or reproducing content to the renderer. At the same time, the user operates the controller so as to cause the controller to transmit an instruction to an apparatus required to be controlled in synchronization with the renderer.

There is a known terminal that includes: means for individually acquiring lists of stored content items from apparatuses; means for displaying the acquired lists of content items; means for allowing a user to select a content item from among content items included in the displayed lists of content items; means for displaying a user interface (UI) that allows the user to use the selected content item on the basis of the attribute of the selected content item; means for causing the UI to receive a user's input about the use of the selected content item; means for controlling one of the apparatuses which stores the selected content item so that the selected content item is transferred from the apparatus storing the selected content item to an apparatus in which the selected content item will be used in accordance with the received user's input; and means for controlling the apparatus in which the transferred content item will be used in accordance with the received user's input (see, for example, patent document 1).

Patent Document 1: Japanese Unexamined Patent Application Publication No. 2005-31804

DISCLOSURE OF INVENTION

Problems to be Solved by the Invention

However, in a case where apparatuses (renderers) to be synchronously controlled vary in accordance with the type of content item, or vary each time a content item is reproduced, it is difficult to specify apparatuses to be synchronously controlled and determine which function of each of these apparatuses should be controlled.

The present invention has been made in view of the above-described background, and it is an object of the present invention to enable synchronous control of a plurality of apparatuses by a simpler operation.

Means for Solving the Problems

A control apparatus according to the present invention includes: storing means for storing a plurality of commands used to synchronously control a plurality of first apparatuses that operate when content is reproduced; and transmission controlling means for controlling transmission of the commands to corresponding ones of the first apparatuses.

The storing means can associate a predetermined attribute of the content with the commands used to synchronously control the first apparatuses and store the commands associated with the predetermined attribute of the content each time the attribute of the content is changed. The transmission controlling means can control transmission of the stored control commands associated with the predetermined attribute of the content to corresponding ones of the first apparatuses.

The predetermined attribute of the content can be the type of the content.

The storing means can associate a predetermined attribute of a second apparatus that is one of the first apparatuses and will reproduce the content with the commands used to synchronously control the first apparatuses and store the commands associated with the predetermined attribute of the second apparatus each time the attribute of the second apparatus is changed. The transmission controlling means can control transmission of the stored commands associated with the predetermined attribute of the second apparatus to corresponding ones of the first apparatuses.

The predetermined attribute of the second apparatus can be the name or location of the second apparatus.

The control apparatus can further include reproducing means for reproducing the content.

The control apparatus can further include reproduction controlling means for controlling the reproducing means. The storing means can store a plurality of commands used to synchronously control the reproducing means and the first apparatuses. The reproduction controlling means can control the reproducing means on the basis of one of the commands which corresponds to the reproducing means.

The transmission controlling means can control transmission of the commands via a network.

The transmission controlling means can control transmission of the commands used to synchronously control the first apparatuses to an apparatus for converting the commands transmitted via the network into infrared commands.

The transmission controlling means can control transmission of the infrared commands.

A control method according to the present invention includes the steps of: controlling storage of a plurality of commands used to synchronously control a plurality of apparatuses that operate when content is reproduced; and controlling transmission of the commands to corresponding ones of the apparatuses.

A program according to the present invention causes a computer to perform processing including the steps of: controlling storage of a plurality of commands used to synchronously control a plurality of apparatuses that operate when content is reproduced; and controlling transmission of the commands to corresponding ones of the apparatuses.

A recording medium according to the present invention records the program that causes a computer to perform processing including the steps of: controlling storage of a plurality of commands used to synchronously control a plurality of apparatuses that operate when content is reproduced; and controlling transmission of the commands to corresponding ones of the apparatuses.

Advantages

As described previously, according to the present invention, a plurality of apparatuses can be synchronously controlled by a simpler operation.

BRIEF DESCRIPTION OF THE DRAWINGS

FIG. 15 is a diagram describing names of renderers and locations of renderers.

Figure 1:
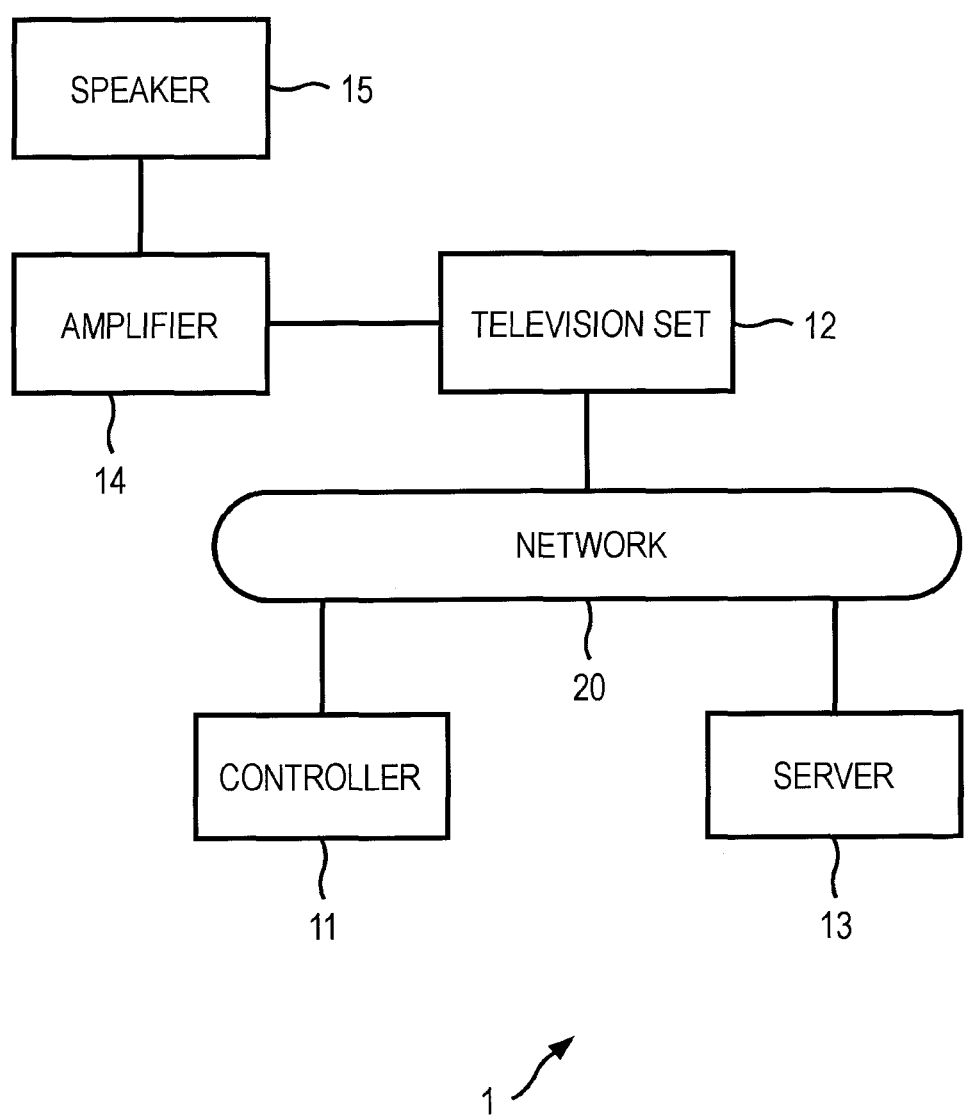
FIG. 1 is a block diagram illustrating a configuration of a reproduction system according to an embodiment of the present invention.

REFERENCE NUMERALS 11 controller
12 television set
13 server
14 amplifier
15 speaker
20 network
31 CPU
34 memory
35 network communication unit
36 infrared communication unit
41 storage device
81 network interface
82 renderer profile information acquisition unit
83 synchronous control pattern specifying unit
84 content list acquisition unit
85 content selection unit
86 content attribute acquisition unit
87 synchronous control information management unit
88 synchronous control information registration unit
89 control pattern analysis unit
90 infrared communication control unit
101 network communication unit
102 control command receiving unit
103 command processing unit
104 content receiving unit
105 decoder
106 content reproduction/display unit
107 apparatus information management unit
121 infrared receiving unit
122 control command receiving unit
123 command processing unit
141 CPU
142 memory
143 recording unit
144 network communication unit
145 bus
161 network interface
162 content distribution processing unit
163 content management unit
164 encoder
301 renderer list acquisition unit
302 renderer selection unit
303 reproduction/display control unit
304 display control unit
321 synchronous control information management unit
322 synchronous control information registration unit
323 control pattern analysis unit
401 converter
421 CPU
422 memory
424 network communication unit
425 infrared transmission unit
441 network interface
442 command acquisition unit
443 conversion unit
444 infrared transmission control unit
461 optical fiber
471 driving unit
472 cable

BEST MODE FOR CARRYING OUT THE INVENTION

FIG. 1 is a block diagram illustrating a configuration of a reproduction system according to an embodiment of the present invention. A reproduction system 1 is provided with a controller 11, a television set 12, a server 13, an amplifier 14, and a speaker 15. The controller 11, the television set 12, and the server 13 are connected to each other via a network 20.

The controller 11 controls the television set 12 and the server 13 via the network 20, and controls the amplifier 14 using infrared rays.

The television set 12 reproduces and displays content supplied via the network 20 from the server 13 under the control of the controller 11.

The server 13 supplies content to the television set 12 via the network 20.

The amplifier 14 is connected to the audio output terminal of the television set 12 via an AV cable. The amplifier 14 amplifies an audio signal transmitted via the AV cable from the audio output terminal of the television set 12, and causes the speaker 15 connected thereto via a speaker cable to output sound corresponding to the audio signal. The speaker 15 is driven by the amplifier 14 and outputs sound.

The network 20 interconnects apparatuses via a wired or wireless medium.

Figure 2:
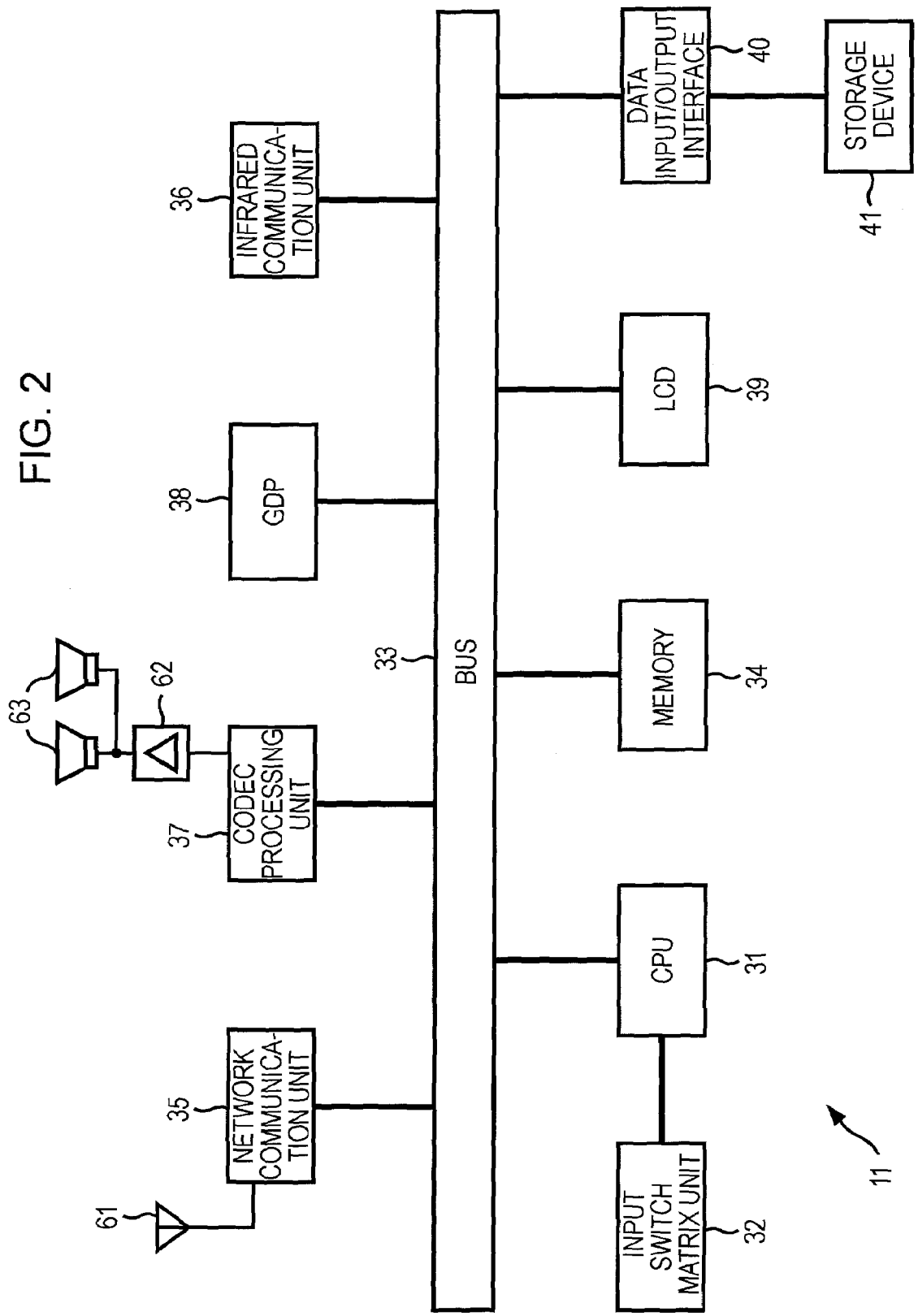
FIG. 2 is a diagram illustrating an exemplary hardware configuration of a controller.

FIG. 2 is a diagram illustrating an exemplary hardware configuration of the controller 11. The controller 11 is provided with a CPU (Central Processing Unit) 31, an input switch matrix unit 32, a bus 33, a memory 34, a network communication unit 35, an infrared communication unit 36, a codec processing unit 37, a GDP (Graphic Display Processor) 38, an LCD (Liquid Crystal Display) 39, a data input/output interface (IF) 40, and a storage device 41.

The controller 11 may be produced as a dedicated terminal, or may be designed as a multifunctional terminal that combines the functions of the controller and another portable terminal such as a PDA (Personal Digital Assistant) or a game machine.

The CPU (Central Processing Unit) 31 centrally controls each unit included in the controller 11 via the bus 33 in accordance with a signal transmitted from the input switch matrix unit 32. The CPU 31 decompresses a program stored on a ROM (Read-Only Memory) onto a RAM (Random Access Memory) in the memory 34, and performs predetermined processing in accordance with the decompressed program. The predetermined processing includes the following: sending/receiving a command/response to/from an apparatus to be controlled via the network 20 as a control signal; sending/receiving content to/from an apparatus to be controlled; transferring a file; and remotely controlling an apparatus to be controlled such as an apparatus compliant with the DLNA (Digital Living Network Alliance) guideline or an apparatus for IR (Infrared Ray) communication. The CPU 31 performs one of these processing operations in accordance with an instruction input by a user.

The input switch matrix unit 32 includes key operation portions such as a numerical keypad, a sound control key, an image quality control key, and a channel selection key. The input switch matrix unit 32 receives an operational instruction for an apparatus to be remotely controlled which has been input by a user, and supplies a signal corresponding to the operational instruction input by the user to the CPU 31. The CPU 31 performs the overall control of the controller 11 in accordance with the supplied signal, and transmits an operation command to the apparatus to be controlled via the network communication unit 35 and the network 20.

The memory 34 includes a ROM or a RAM, and stores a program for executing the above-described processing flow.

The network communication unit 35 communicates with another apparatus via the network 20.

For example, the network communication unit 35 is provided with a network interface for communicating with an access point via an antenna 61 and the network 20 that is a wireless network compliant with the IEEE (Institute of Electrical and Electronic Engineers) 802.11a or b standard.

Unique identification information used on the network 20 which includes a MAC (Media Access Control) address and an IP (Internet Protocol) address is set for the network communication unit 35.

The infrared communication unit 36 is compliant with the SIRCS (Serial Infrared Remote Control System) standard that is an infrared communication standard widely applied to remote controllers for AV apparatuses, and transmits an infrared command.

The codec processing unit 37 performs coding or decoding of AV content. For example, the codec processing unit 37 decodes AV content received via the network communication unit 35 from the server 13. The AV content is an example of content coded in accordance with a coding standard such as the MPEG (Moving Picture Experts Group)-4 standard. Sound and video obtained by the decoding is output. If the television set 12, which is a target to be operated by the controller 11, transmits received moving image data for a subscreen to the controller 11 via the network 20, the codec processing unit 37 decodes the moving image data transmitted from the television set 12. A moving image obtained by the decoding is displayed on the LCD 39 of the controller 11, whereby a user can watch the moving image for a subscreen on the LCD 39.

The codec processing unit 37 supplies sound (an audio signal) obtained by decoding to an amplifier 62. The amplifier 62 amplifies the audio signal, and causes the speaker 63 to output sound.

A GDP (Graphic Display Processor) 38 performs the following: processing regarding drawing data to be displayed on the LCD (Liquid Crystal Display) 39; driving the LCD 39; and controlling the LCD 39. For example, the GDP 38 generates drawing data (image data) on the basis of a signal obtained by decoding performed by the codec processing unit 37, and supplies the generated image data to the LCD 39. Consequently, an image is displayed on the screen of the LCD 39. Furthermore, the GDP 38 acquires information from an apparatus connected to the network 20, and causes the LCD 39 to display a user interface that allows a user to operate the apparatus on the basis of the acquired information.

The LCD 39 displays an image on the basis of image data supplied from the GDP 38.

The data input/output interface 40 is configured with a wired interface such as a USB (Universal Serial Bus) or a slot for a memory card. The storage device 41 is connected to the data input/output interface 40. The storage device 41 is, for example, a drive to which a removable medium such as a hard disk, a semiconductor memory, or an optical disc is removably connected. Content stored in the storage device 41 is read out via the data input/output interface 40, and is then supplied to the codec processing unit 37. The codec processing unit 37 decodes the supplied content that has been coded. Furthermore, content coded in accordance with a predetermined coding method by the codec processing unit 37 is supplied to the storage device 41 via the data input/output interface 40, and is then stored in the storage device 41.

Here, the CPU 31 may read out a program stored in the storage device 41, store the read program on the memory 34, and execute the stored program. Alternatively, the CPU 31 may store a program supplied via the network 20 on the memory 34, and execute the stored program.

Figure 3:
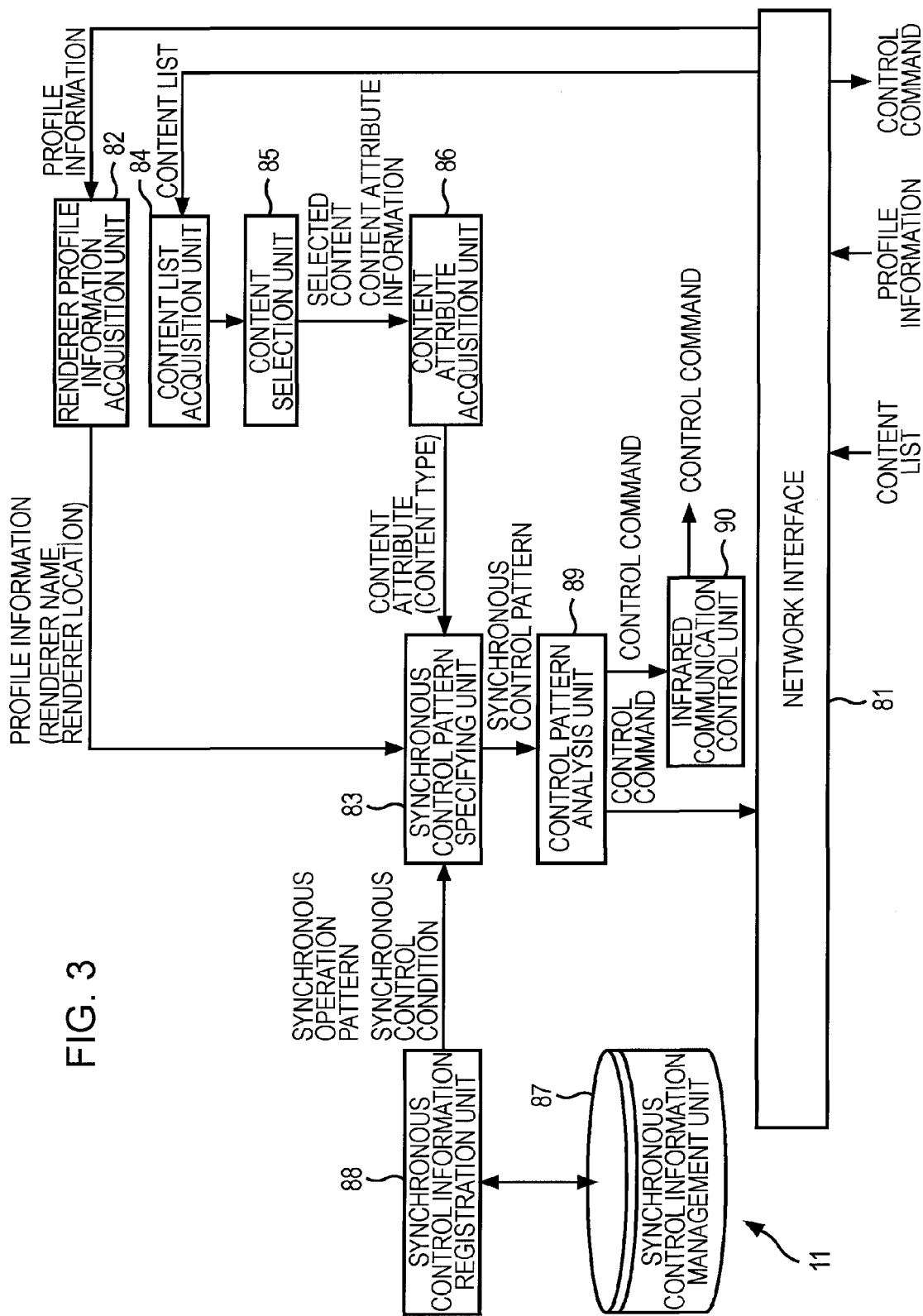
FIG. 3 is a block diagram illustrating an exemplary functional configuration of a controller for executing a program.

FIG. 3 is a block diagram illustrating an exemplary functional configuration of the controller 11 for executing a program.

The controller 11 executes a program, whereby a network interface 81, a renderer profile information acquisition unit 82, a synchronous control pattern specifying unit 83, a content list acquisition unit 84, a content selection unit 85, a content attribute acquisition unit 86, a synchronous control information management unit 87, a synchronous control information registration unit 88, a control pattern analysis unit 89, and an infrared communication control unit 90 are achieved.

The network interface 81 controls the network communication unit 35 so as to control connection between the network communication unit 35 and the network 20 and communication between the network communication unit 35 and another apparatus via the network 20.

The renderer profile information acquisition unit 82 acquires profile information (a renderer name, a renderer location, etc.) on a renderer that is included in the reproduction system 1 via the network interface 81, and the acquired profile information to the synchronous control pattern specifying unit 83.

The synchronous control pattern specifying unit 83 specifies a synchronous control pattern on the basis of synchronous operation patterns and synchronous control conditions which have been supplied from the synchronous control information registration unit 88, the profile information supplied from the renderer profile information acquisition unit 82, and content attribute information supplied from the content attribute acquisition unit 86. The synchronous control pattern includes pieces of information on operations of apparatuses to be synchronously controlled.

Here, the content attribute information is information on the attribute of content. For example, the content attribute information is information on the type of content.

The content list acquisition unit 84 acquires a content list transmitted from the server 13 via the network interface 81, and supplies the acquired content list to the content selection unit 85.

The content selection unit 85 causes the LCD 39 to display the content list supplied from the content list acquisition unit 84. For example, the content selection unit 85 displays the content list on a GUI (Graphical User Interface) screen. The content selection unit 85 selects a content item from among content items included in the displayed content list on the basis of a signal corresponding to a user's operation which has been supplied from the input switch matrix unit 32, and supplies information on the selected content item and information on the attribute of the selected content item to the content attribute acquisition unit 86.

The content attribute acquisition unit 86 extracts information on the type of the selected content item from the information on the attribute of the content item selected by a user, and supplies the extracted information on the type of the selected content item to the synchronous control pattern specifying unit 83.

The synchronous control information management unit 87 stores synchronous control information used to control apparatuses in synchronization with each other. The synchronous control information includes synchronous operation patterns and synchronous control conditions. In each of the synchronous operation patterns, a procedure for sequentially transmitting control commands to a plurality of apparatuses is defined using a single pattern name. For example, in each of the synchronous operation patterns, control commands for apparatuses to be synchronously controlled are arranged. In each of the synchronous control conditions, a condition to select one of the synchronous operation patterns is described. For example, in each of the synchronous control conditions, a type of content item is described so that a synchronous operation pattern can be specified on the basis of the type of content item.

The synchronous control information registration unit 88 causes the synchronous control information management unit 87 to store the synchronous control information. Furthermore, the synchronous control information registration unit 88 reads out the synchronous control information from the synchronous control information management unit 87, and supplies the synchronous operation patterns and the synchronous control conditions, which are included in the synchronous control information, to the synchronous control pattern specifying unit 83.

The synchronous control pattern specifying unit 83 specifies a single synchronous operation pattern as the synchronous control pattern on the basis of the synchronous operation patterns and the synchronous control conditions which have been supplied from the synchronous control information registration unit 88, the profile information supplied from the renderer profile information acquisition unit 82, and the content attribute information supplied from the content attribute acquisition unit 86, and supplies the specified synchronous control pattern to the control pattern analysis unit 89.

The control pattern analysis unit 89 analyzes the synchronous control pattern detected by the synchronous control pattern specifying unit 83, sequentially generates control commands for controlling apparatuses on the basis of the analysis result, and supplies the generated control commands to the network interface 81 or the infrared communication control unit 90.

The infrared communication control unit 90 causes the infrared communication unit 36 to transmit the control commands supplied from the control pattern analysis unit 89.

The network interface 81 causes the network communication unit 35 to transmit via the network 20 the control commands supplied from the control pattern analysis unit 89.

Figure 4:
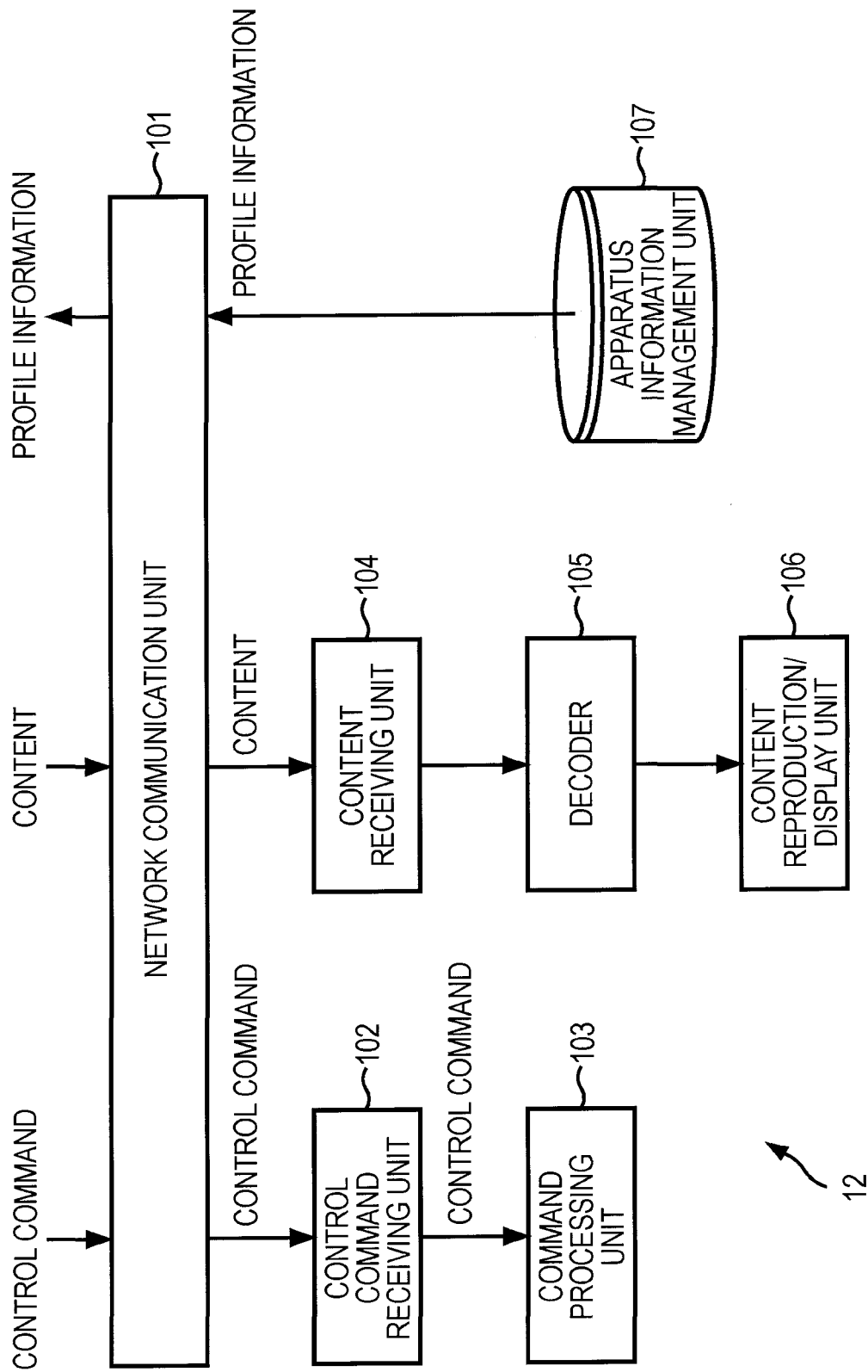
FIG. 4 is a block diagram illustrating an exemplary configuration of a television set.

FIG. 4 is a block diagram illustrating an exemplary configuration of the television set 12.

The television set 12 is provided with a network communication unit 101, a control command receiving unit 102, a command processing unit 103, a content receiving unit 104, a decoder 105, a content reproduction/display unit 106, and an apparatus information management unit 107.

The network communication unit 101 communicates with another apparatus via the network 20.

The control command receiving unit 102 receives a control command via the network communication unit 101, and supplies the received control command to the command processing unit 103.

The command processing unit 103 executes the control command supplied from the control command receiving unit 102, and controls each unit included in the television set 12 in accordance with the control command.

The content receiving unit 104 receives content via the network communication unit 101, and supplies the received content to the decoder 105.

The decoder 105 decodes the supplied content, which has been coded, and supplies the decoded content to the content reproduction/display unit 106.

The content reproduction/display unit 106 reproduces and displays the content decoded by the decoder 105. For example, the content reproduction/display unit 106 is configured with an LCD (Liquid Crystal Display) or a CRT (Cathode Ray Tube).

The apparatus information management unit 107 stores profile information (a renderer name, a renderer location, etc.) on the television set 12, and supplies the stored profile information to the network communication unit 101.

Figure 5:
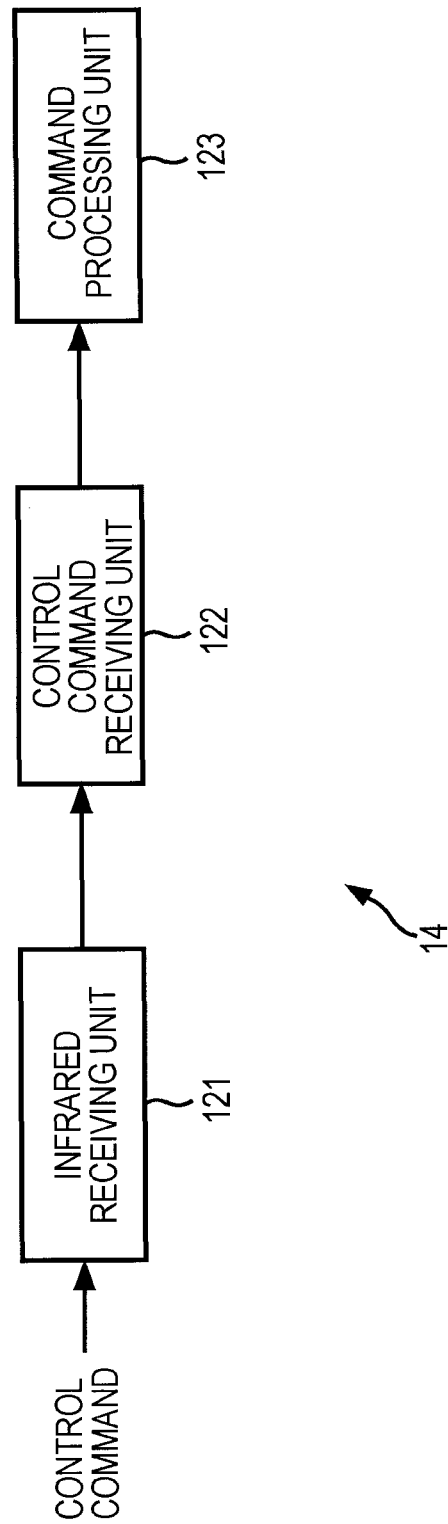
FIG. 5 is a block diagram illustrating an exemplary functional configuration of an amplifier.

FIG. 5 is a block diagram illustrating an exemplary functional configuration of the amplifier 14.

The amplifier 14 is provided with an infrared receiving unit 121, a control command receiving unit 122, and a command processing unit 123.

The infrared receiving unit 121 receives infrared rays that have been emitted from the controller 11 as a control command, and supplies a signal corresponding to the received infrared rays to the control command receiving unit 122.

The control command receiving unit 122 extracts a control command signal pattern from the signal supplied from the infrared receiving unit 121, thereby receiving a control command. The control command receiving unit 122 supplies the control command to the command processing unit 123.

The command processing unit 123 executes the supplied control command and controls each unit included in the amplifier 14.

Figure 6:
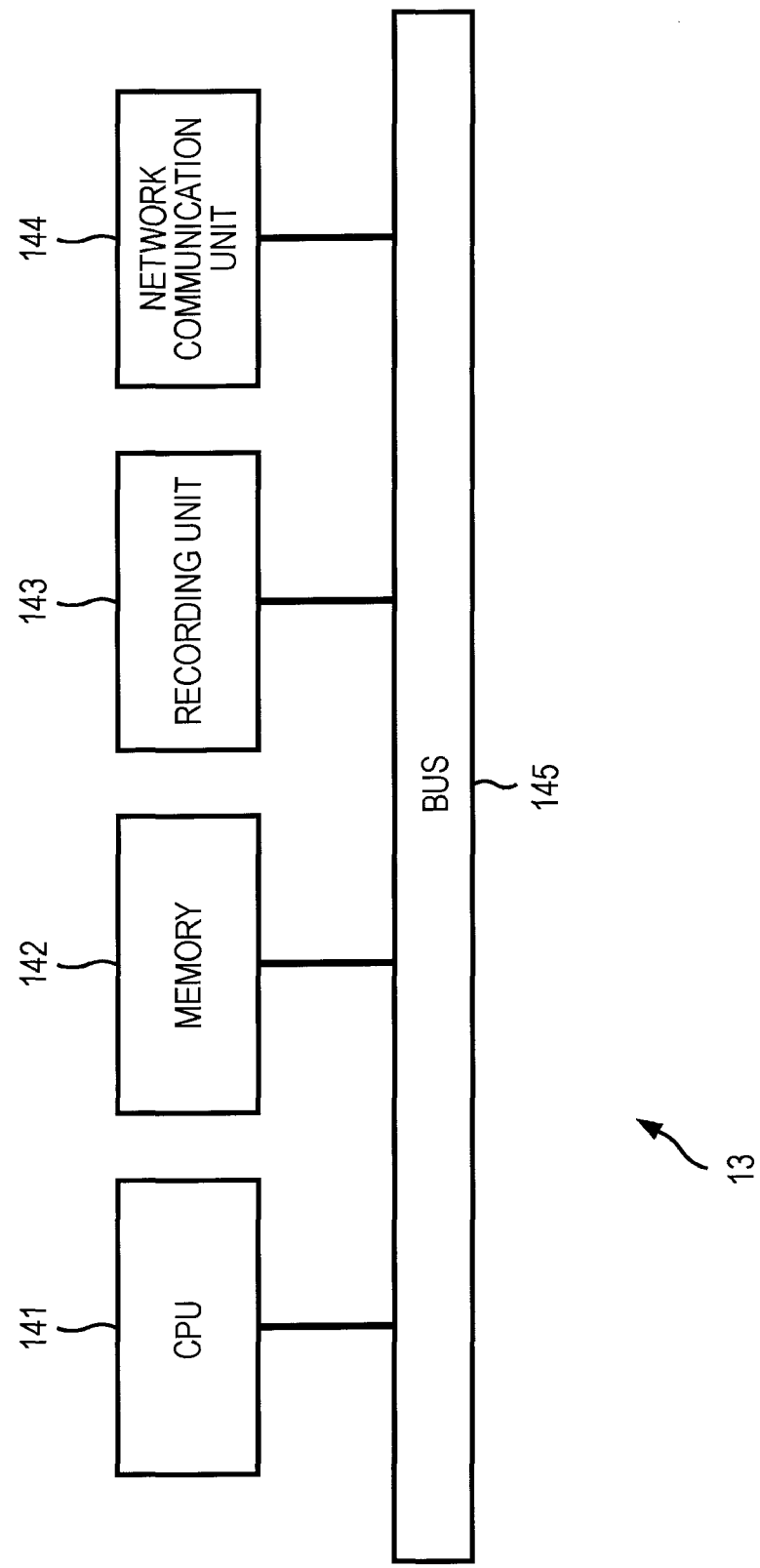
FIG. 6 is a block diagram illustrating an exemplary hardware configuration of a server.

FIG. 6 is a block diagram illustrating an exemplary hardware configuration of the server 13. The server 13 is provided with a CPU 141, a memory 142, a recording unit 143, a network communication unit 144, and a bus 145.

The CPU 141 performs various processing operations in accordance with a program stored on the memory 142 or a program recorded in the recording unit 143. A program to be executed by the CPU 141 and data are stored on the memory 142 as appropriate. The CPU 141 and the memory 142 are interconnected via the bus 145.

The recording unit 143 connected to the bus 145 is configured with, for example, a hard disk, and records a program to be executed by the CPU 141 and various pieces of data. The network communication unit 144 communicates with an external apparatus via the network 20, the Internet, another network, or a communication medium.

The server 13 may acquire a program via the network communication unit 144 and may record the acquired program in the recording unit 143 via the bus 145.

Figure 7:
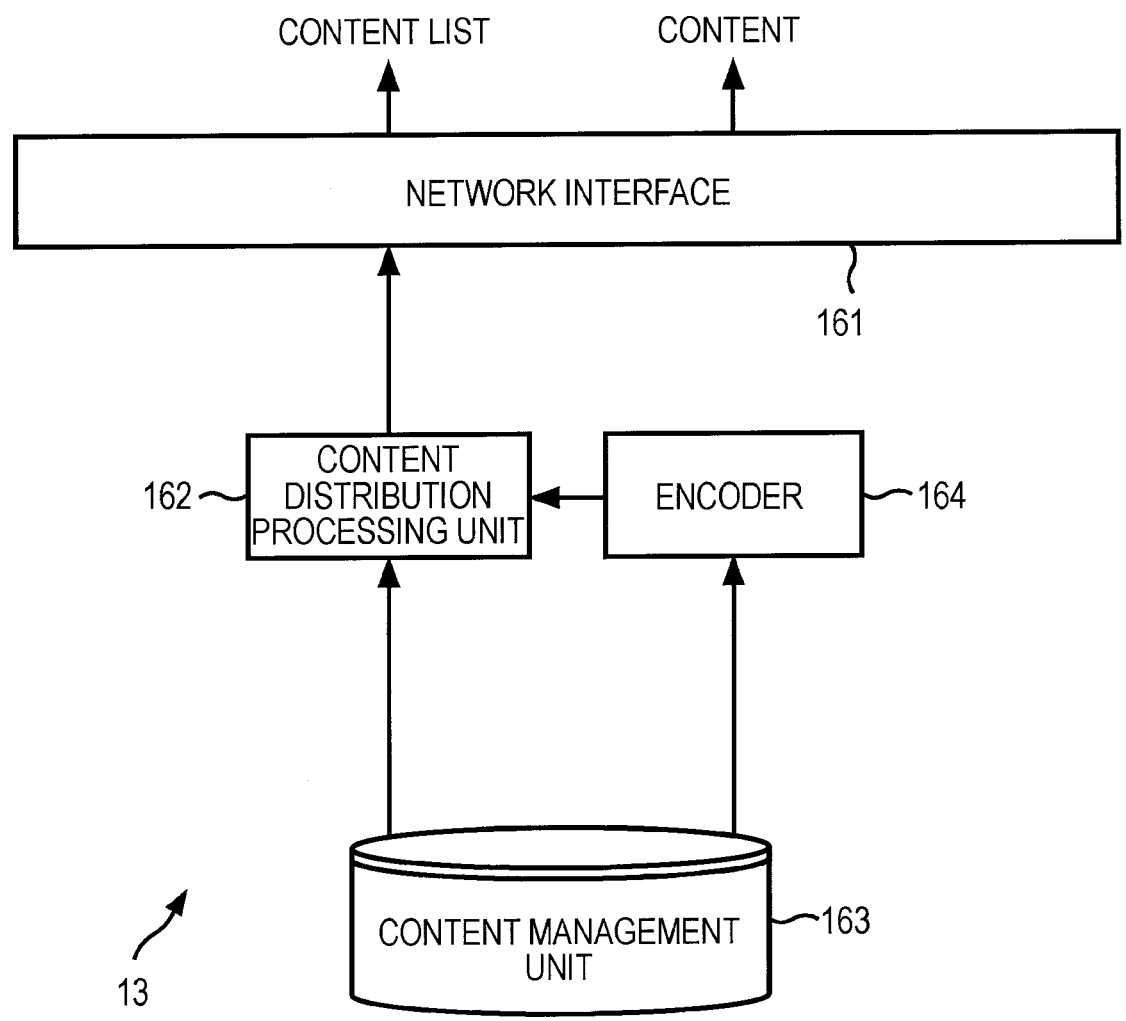
FIG. 7 is a block diagram illustrating an exemplary functional configuration of a server for executing a program.

FIG. 7 is a block diagram illustrating an exemplary functional configuration of the server 13 for executing a program.

The server 13 executes a program, whereby a network interface 161, a content distribution processing unit 162, a content management unit 163, and an encoder 164 are achieved.

The network interface 161 controls the network communication unit 144 so as to control the connection between the network communication unit 144 and the network 20 and the communication between the network communication unit 144 and another apparatus via the network 20.

The content distribution processing unit 162 supplies content supplied from the content management unit 163 or the encoder 164 to the network interface 161. The network interface 161 supplies the content transmitted from the content distribution processing unit 162 to another apparatus via the network 20.

The content management unit 163 records content, and supplies the recorded content to the content distribution processing unit 162 or the encoder 164.

The encoder 164 encodes (performs coding of) the content supplied from the content management unit 163 in accordance with a predetermined coding method, and supplies the encoded content to the content distribution processing unit 162.

Figure 8:
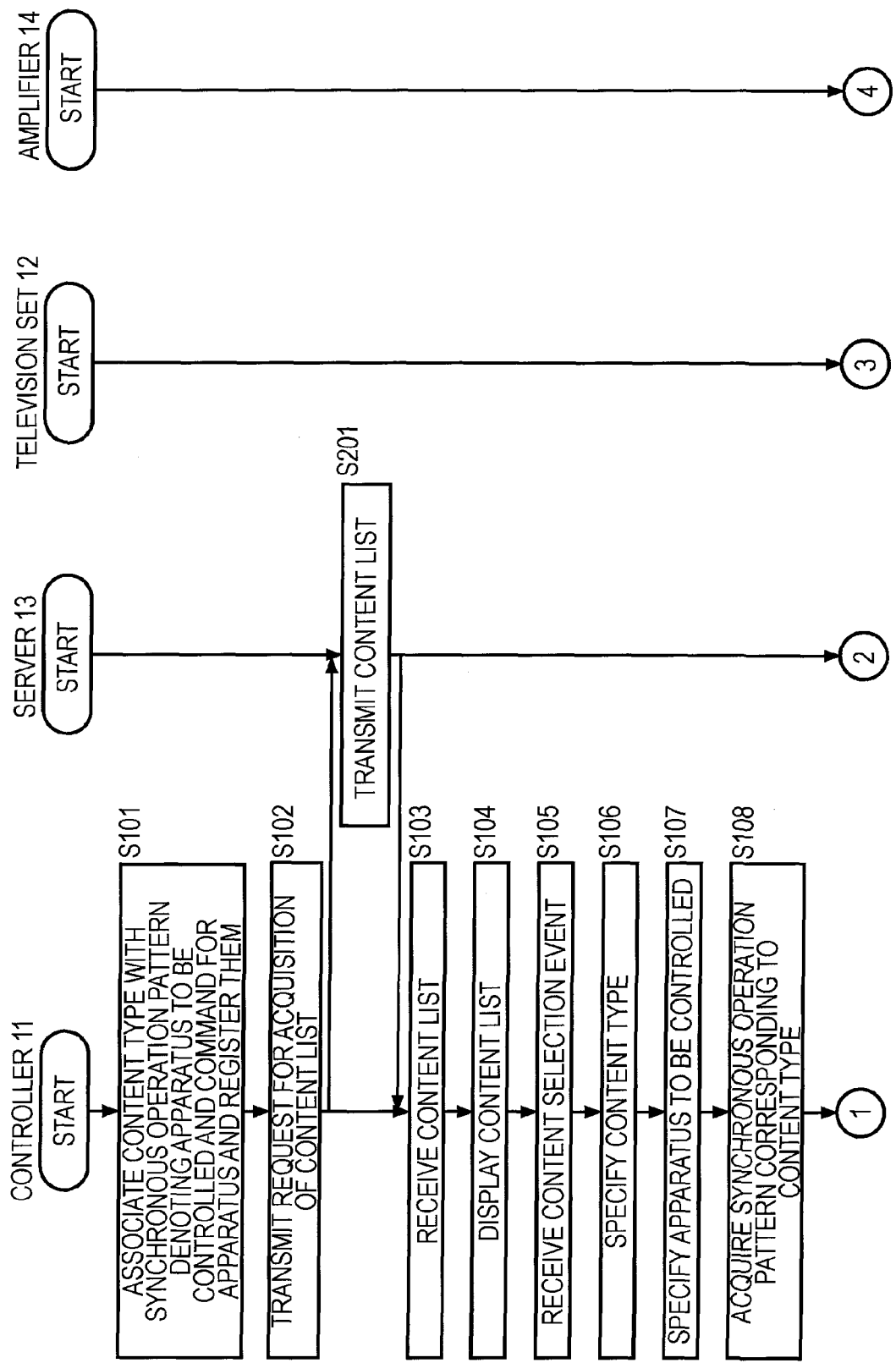
FIG. 8 is a flowchart describing a content reproduction process.

Next, a content reproduction process will be described with reference to FIGS. 8 and 9.

In step S101, the synchronous control information registration unit 88 individually associates the types of content items with synchronous operation patterns and synchronous control conditions, and registers them in the synchronous control information management unit 87. Each of the synchronous operation patterns includes pieces of information on apparatuses to be controlled and pieces of information on control commands for the apparatuses. Upon receiving a registration request from the synchronous control information registration unit 88, the synchronous control information management unit 87 records the synchronous operation patterns and the synchronous control conditions. That is, the synchronous control information registration unit 88 registers pieces of information on apparatuses required to be controlled when a type of content item is reproduced and displayed and pieces of information on control commands used to control the apparatuses in the synchronous control information management unit 87 on a content type-by-content type basis.

Figure 10:
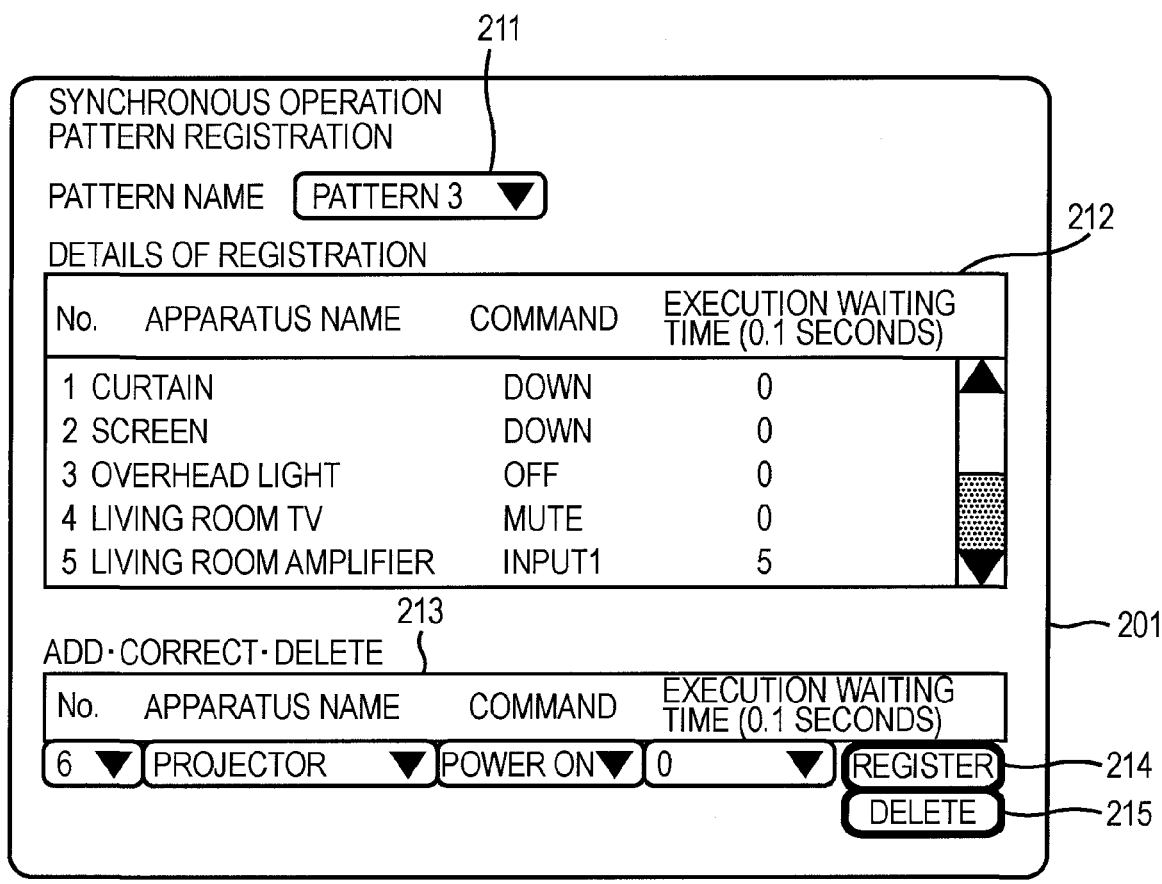
FIG. 10 is a diagram illustrating an example of a screen displayed on an LCD of a controller.

FIG. 10 is a diagram illustrating an example of a screen displayed on the LCD 39 of the controller 11 when a synchronous operation pattern is registered.

On a synchronous operation pattern registration screen 201, a pattern name selection button 211, an operation pattern display portion 212, a command editing portion 213, a registration button 214, and a delete button 215 are arranged.

The pattern name selection button 211 is a button used to select one of pattern names. For example, when the pattern name selection button 211 is operated by a user, a menu allowing the user to select any one of patterns 1 to 5 is displayed. The user selects a desired pattern name on the displayed menu, whereby one of the pattern names is selected. For example, as show in FIG. 10, pattern 3 is selected by a user's operation.

On the operation pattern display screen 212, a present operation pattern registered for the pattern name selected using the pattern name selection button 211 is displayed. For example, if pattern 3 is selected, a present operation pattern registered for pattern 3 is displayed on the operation pattern display screen 212.

The operation pattern includes information on one operation or pieces of information on a plurality of operations that are arranged in a predetermined order. The information on one operation includes information on an apparatus to be operated, information on a control command for the apparatus, and information on a waiting time for the execution of the control command. The waiting time for the execution of a control command is a period from the execution of an antecedent control command to the execution of a subsequent control command. For example, in the case of the example shown in FIG. 10, information on the first operation indicates that a target to be operated is a curtain, a control command for the curtain is "down", and a waiting time for the execution of the control command is 0.0 second. Information on the second operation indicates that a target to be operated is a screen, a control command for the screen is "down", and a waiting time for the execution of the control command is 0.0 second. Information on the third operation indicates that a target to be operated is an overhead light, a control command for the overhead light is "off", and a waiting time for the execution of the control command is 0.0 second. Information on the fourth operation indicates that a target to be operated is a living room television set, a control command for the living room television set is "mute", and a waiting time for the execution of the control command is 0.0 second. Information on the fifth operation indicates that a target to be operated is a living room amplifier, a control command for the living room amplifier is "input 1", and a waiting time for the execution of the control command is 0.5 seconds.

The command editing portion 213 is operated so as to add information on an operation to the operation pattern displayed on the operation pattern display screen 212, or correct or delete one of the pieces of information on operations included in the operation pattern displayed on the operation pattern display screen 212. When the registration button 214 is operated, information on an operation displayed on the command editing portion 213 is registered in the operation pattern corresponding to a displayed pattern name. For example, it is assumed that information on the sixth operation has not yet been registered. At that time, in the command editing portion 213, the sixth operation is selected, a projector is selected as a target to be operated, "power on" is selected as a control command for the projector, the waiting time of 0.0 second for the execution of the control command is selected, and then the registration button 214 is operated. Consequently, information on the sixth operation in which a target to be operated is the projector, a control command for the projector is "power on", and a waiting time for the execution of the control command is 0.0 second is added to the operation pattern of pattern 3.

Furthermore, if information on the registered operation is selected in the command editing portion 213, an apparatus to be operated, a control command for the apparatus, and a waiting time for the execution of the control command, which correspond to the selected operation, are displayed in the command editing portion 213. If any one of the above-described displayed items is changed and then the registration button 214 is operated, the information on the operation registered in the operation pattern is corrected.

If the delete button 215 is operated, information on the operation displayed in the command editing portion 213 is deleted from the operation pattern.

Thus, an operation pattern can be easily corrected.

Figures 11, 12:
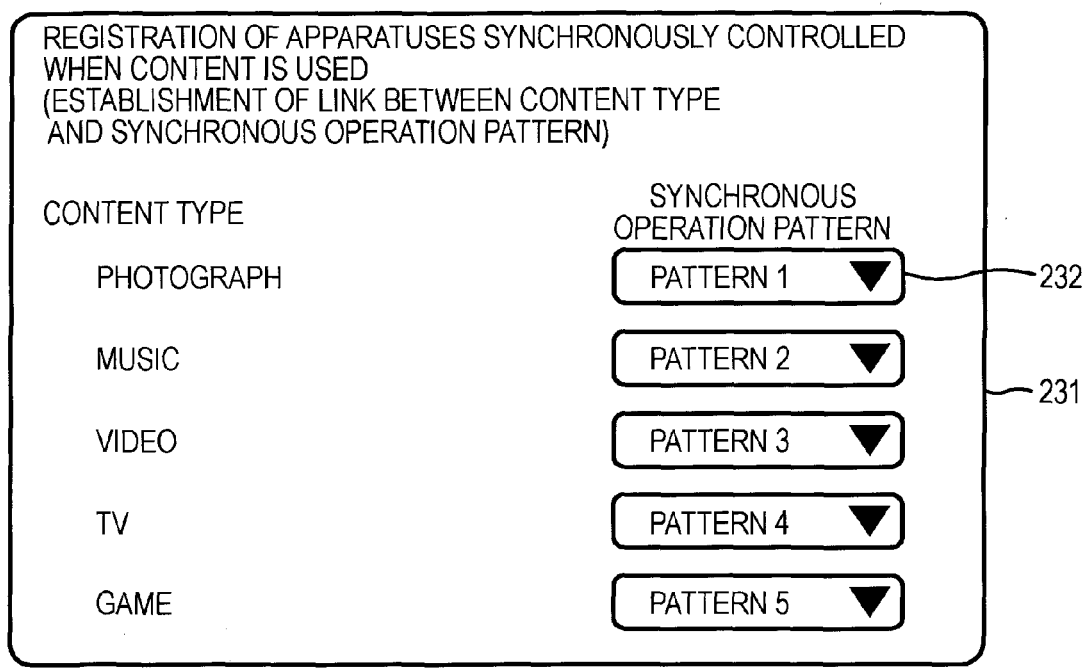
FIG. 11 is a diagram illustrating an example of a screen displayed on an LCD of a controller.
FIG. 12 is a diagram describing types of content items.

FIG. 11 is a diagram illustrating an example of a screen displayed on the LCD 39 of the controller 11 when a synchronous control condition is registered.

If synchronous control conditions each defines a link between a type of content item and a synchronous operation pattern are registered, synchronous operation pattern selection buttons 232 each of which is used to select one of synchronous operation patterns and associate the selected synchronous operation pattern with a type of content item are arranged on a synchronously controlled apparatus registration screen 231 as shown in FIG. 11.

For example, if pattern 1 is selected by one of the synchronous operation pattern selection buttons 232 which is a button corresponding to a type of content item "photograph", a synchronous control condition is set by associating the type of content item "photograph" (still image) with pattern 1. If pattern 2 is selected by one of the synchronous operation pattern selection buttons 232 which is a button corresponding to a type of content item "music", a synchronous control condition is set by associating the type of content item "music" (sound) with pattern 2. If pattern 3 is selected by one of the synchronous operation pattern selection buttons 232 which is a button corresponding to a type of content item "video", a synchronous control condition is set by associating the type of content item "video" (moving image) with pattern 3. If pattern 4 is selected by one of the synchronous operation pattern selection buttons 232 which is a button corresponding to a type of content item "TV", a synchronous control condition is set by associating the type of content item "TV" with pattern 4. If pattern 5 is selected by one of the synchronous operation pattern selection buttons 232 which is a button corresponding to a type of content item "game", a synchronous control condition is set by associating the type of content item "game" with pattern 5.

By performing the above-described setting operations, a synchronous operation pattern can be specified on the basis of a type of content item. Furthermore, apparatuses can be controlled in accordance with the specified synchronous operation pattern.

Here, the synchronous control information includes lists of available renderers (for example, the television set 12 that transmits a content distribution request to the server 13) on a content type-by-content type basis. In each of the lists included in the synchronous control information, priorities are assigned to the available renderers. Accordingly, if a type of content item is specified, a renderer for reproducing the content item (apparatuses to be controlled) can be specified.

In step S102, the content list acquisition unit 84 included in the controller 11 transmits a content list acquisition request to the server 13 via the network interface 81. A content list includes available content items.

In step S201, the network interface 161 included in the server 13 transmits a content list of available content items to the controller 11 via the network 20 in response to the content list acquisition request transmitted from the controller 11.

In step S103, the content list acquisition unit 84 causes the network interface 81 to receive the content list transmitted via the network 20 from the server 13, acquires the content list from the network interface 81, and supplies the acquired content list to the content selection unit 85. The content list also includes pieces of information on the attributes of the content items included therein.

In step S104, the content selection unit 85 causes the LCD 39 to display the content list. More specifically, the content selection unit 85 supplies the content list to the GDP 38 so as to cause the GDP 38 to generate image data for the content list. The GDP 38 supplies the generated image data to the LCD 39 so as to cause the LCD 39 to display the content list.

In step S105, the content selection unit 85 receives a user's content item selection event in which a user selects a content item from among the content items included in the content list displayed in step S104. For example, the content selection unit 85 receives a user's content item selection event by receiving a signal corresponding to a user's content item selection operation from the input switch matrix unit 32. The content selection unit 85 supplies information on the selected content item and information on the attribute of the selected content item to the content attribute acquisition unit 86.

In step S106, the content attribute acquisition unit 86 specifies the type of the content item selected in step S105 on the basis of the information on the selected content item and the information on the attribute of the selected content item. Here, the type of content item denotes the form of a content item such as photograph (still image), music (sound), video (moving image), TV, or game. The content attribute acquisition unit 86 supplies information on the attribute (type) of the selected content item to the synchronous control pattern specifying unit 83.

In step S107, the synchronous control pattern specifying unit 83 acquires the synchronous control information stored in the synchronous control information management unit 87 from the synchronous control information management unit 87 via the synchronous control information registration unit 88. The synchronous control pattern specifying unit 83 specifies an apparatus to be controlled (for example, the television set 12), which is a renderer available for the specified content type indicated by the content item attribute information supplied from the content attribute acquisition unit 86, on the basis of the lists of available renderers included in the synchronous control information. The lists of available renderers are provided on a content type-by-content type basis. In each of the lists, priorities are assigned to the available renderers.

In step S108, the synchronous control pattern specifying unit 83 acquires a synchronous operation pattern corresponding to the content item attribute information (content type information) supplied from the content attribute acquisition unit 86. That is, the synchronous control pattern specifying unit 83 acquires a synchronous operation pattern corresponding to the content item attribute information (content type information) by retrieving a corresponding synchronous control condition associated with a synchronous operation pattern from among synchronous control conditions each associated with a synchronous operation pattern, and specifying a synchronous operation pattern associated with the retrieved synchronous control condition. The synchronous control pattern specifying unit 83 specifies the acquired synchronous operation pattern as a synchronous control pattern, and supplies the specified synchronous control pattern to the control pattern analysis unit 89.

In step S109, the control pattern analysis unit 89 supplies a control command to the network interface 81 or the infrared communication control unit 90 on the basis of the supplied synchronous control pattern. In the case of the network interface 81, the network interface 81 causes the network communication unit 35 to transmit the control command to a corresponding apparatus via the network 20. In the case of the infrared communication control unit 90, the infrared communication control unit 90 causes the infrared communication unit 36 to transmit the control command using infrared rays. More specifically, for example, in step S109, the control pattern analysis unit 89 supplies a control command for causing the television set 12 to mute sound output from its built-in speaker to the network interface 81. The network interface 81 causes the network communication unit 35 to transmit the control command for causing the television set 12 to mute sound output from its built-in speaker via the network 20.

More specifically, for example, the control pattern analysis unit 89 transmits to the network interface 81 the control command that is used to cause the television set 12 to mute sound output from its built-in speaker and that is compliant with the DLNA guideline. The network interface 81 causes the network communication unit 35 to transmit the control command compliant with the DLNA guideline to the television set 12 via the network 20.

Here, a control command transmitted from the controller 11 to the television set 12 via the network 20 is not limited to a control command compliant with the DLNA guideline. For example, the controller 11 may transmit a control command compliant with another standard such as the UPnP (Universal Plug and Play) standard or another guideline to the television set 12 via the network 20.

Furthermore, the controller 11 may transmit a control command corresponding to an infrared command for which infrared rays are used to the television set 12 via the network 20. Here, it is required that a single infrared command can be specified on the basis of a control command corresponding to an infrared command. For example, a control command corresponding to an infrared command may be a control command including a value that denotes a flashing pattern corresponding to an infrared command, a control command including an ID for specifying an infrared command, or a control command including data of a manufacturer, an apparatus, or an operation indicated by an infrared command.

In step S301, the control command receiving unit 102 included in the television set 12 causes the network communication unit 101 to receive the control command transmitted from the controller 11 via the network 20, and acquires the control command from the network communication unit 101. The control command receiving unit 102 supplies the acquired control command to the command processing unit 103. The command processing unit 103 executes the control command supplied from the control command receiving unit 102. That is, for example, the command processing unit 103 controls each unit included in the television set 12 so as to mute sound output from a built-in speaker included in the television set 12 on the basis of the control command for causing the television set 12 to mute sound output from its built-in speaker.

More specifically, the command processing unit 103 controls each unit included in the television set 12 so as to mute sound output from a built-in speaker included in the television set 12 on the basis of the control command that is compliant with the DLNA guideline and that is used to cause the television set 12 to mute sound output from its built-in speaker.

Here, a control command executed by the command processing unit 103 is not limited to a control command compliant with the DLNA guideline. For example, the command processing unit 103 may control each unit included in the television set 12 by executing a control command compliant with another standard such as the UPnP standard or another guideline.

Furthermore, the command processing unit 103 may control each unit included in the television set 12 by executing a control command corresponding to an infrared command for which infrared rays are used.

In step S110, the control pattern analysis unit 89 determines whether there is another apparatus to be controlled on the basis of the synchronous control pattern. If it is determined in step S110 that there is another apparatus to be controlled, the process proceeds to step S111. In step S111, the control pattern analysis unit 89 supplies a control command to the network interface 81 or the infrared communication control unit 90 on the basis of the synchronous control pattern. The processing of the step S111 is repeated until it is determined that there is no apparatus to be controlled on the basis of the synchronous control pattern. More specifically, for example, in step S111, the infrared communication control unit 90 causes the infrared communication unit 36 to transmit to the amplifier 14 using infrared rays a control command for selecting one of inputs acquired from an external output terminal of the television set 12.

In step S401, the infrared receiving unit 121 included in the amplifier 14 receives infrared rays that have been transmitted from the controller 11 as a control command. The control command receiving unit 122 extracts a signal pattern corresponding to the control command from a signal transmitted from the infrared receiving unit 121, thereby receiving the control command for selecting one of inputs acquired from the external output terminal of the television set 12. The command processing unit 123 executes the control command for selecting one of inputs acquired from the external output terminal of the television set 12, and controls each unit included in the amplifier 14. Consequently, the amplifier 14 selects one of inputs acquired from an input terminal thereof that is connected to the external output terminal of the television set 12 via an AV cable. Accordingly, the amplifier 14 can amplify an audio signal input from the input terminal and cause the speaker 15 to output sound corresponding to the audio signal.

For example, as shown in FIGS. 10 and 11, it is assumed that the synchronous control information synchronous control conditions and synchronous operation patterns is stored in the synchronous control information management unit 87. If a user selects a content item whose content type is "video", the content attribute acquisition unit 86 determines that the type of the selected content item is "video" on the basis of the content item attribute information in step S106. Subsequently, in step S108, the synchronous control pattern specifying unit 83 acquires the synchronous operation pattern of pattern 3 on the basis of a synchronous control condition that indicates that the content type "video" is associated with pattern 3. The acquired synchronous operation pattern of pattern 3 is supplied to the control pattern analysis unit 89 as a synchronous control pattern.

As shown in FIG. 12, the type of content item is, for example, "photograph", "music", "video", "TV", "game", or the combination thereof. The attribute of a content item represented by the content item attribute information denotes the type of content item such as "photograph", "music", "video", "TV", "game", or the combination thereof.

The synchronous control information includes the lists of available renderers. The lists of available renderers are provided on a content type-by-content type basis. In each of the lists, priorities are assigned to the available renderers. Accordingly, if a type of content item is selected, a renderer that will reproduce the content item is specified. That is, apparatuses to be synchronously controlled are specified in accordance with the type of the selected content item.

In step 109 to step S111, corresponding control commands are individually transmitted to apparatuses to be operated in accordance with the order described in the synchronous operation pattern of pattern 3. Consequently, for example, first, an electric curtain is closed. Subsequently, a screen for a projector is lowered, an overhead light is turned off, and sound of a living room television set is muted. After 0.5 seconds have been elapsed, the input of a living room amplifier is set to an input 1.

In step S112, the control pattern analysis unit 89 supplies a control command for causing the television set 12 to reproduce and display the selected content item to the network interface 81. The network interface 81 causes the network communication unit 35 to transmit the control command for causing the television set 12 to reproduce and display the selected content item via the network 20.

In step S302, the control command receiving unit 102 included in the television set 12 causes the network communication unit 101 to receive the control command transmitted from the controller 11 via the network 20, and receives the control command from the network communication unit 101. The command processing unit 103 controls the content receiving unit 104 on the basis of the control command for causing the television set 12 to reproduce and display the selected content item. The content receiving unit 104 causes the network communication unit 101 to transmit a request for distribution of the selected content item via the network 20. The network communication unit 101 transmits the request for distribution of the selected content item to the server 13 via the network 20.

In step S202, the server 13 starts to distribute the requested content item. More specifically, upon receiving the content item distribution request, the network interface 161 included in the server 13 supplies the content item distribution request to the content distribution processing unit 162. The content distribution processing unit 162 causes the content management unit 163 to start to supply the selected content item stored therein to the encoder 164. The encoder 164 codes the supplied content item, and supplies the coded content item to the content distribution processing unit 162. The content distribution processing unit 162 supplies the content item acquired from the encoder 164 to the network interface 161. The network interface 161 starts to distribute the supplied content item to the television set 12 via the network 20.

In step S303, the content receiving unit 104 receives the content item transmitted from the server 13 via the network communication unit 101. The content receiving unit 104 supplies the received content item to the decoder 105. The decoder 105 decodes the coded content item, and supplies the decoded content item to the content reproduction/display unit 106. The content reproduction/display unit 106 starts to reproduce and display the content item decoded by the decoder 105.

In step S304, the television set 12 starts to output sound to an external terminal thereof.

In step S402, the amplifier 14 amplifies an audio signal that has been input from an input terminal thereof connected to the external output terminal of the television set 12 via an AV cable, and causes the speaker 15 to start to output sound corresponding to the audio signal. Here, the process ends.

Thus, according to the content reproduction process described with reference to FIGS. 8 and 9, predetermined control commands are individually transmitted to apparatuses registered in advance in accordance with the type of selected content item. Accordingly, a plurality of apparatuses can be synchronously controlled by a simpler operation.

Here, the name of a renderer may be associated with a synchronous operation pattern.

Figure 13:
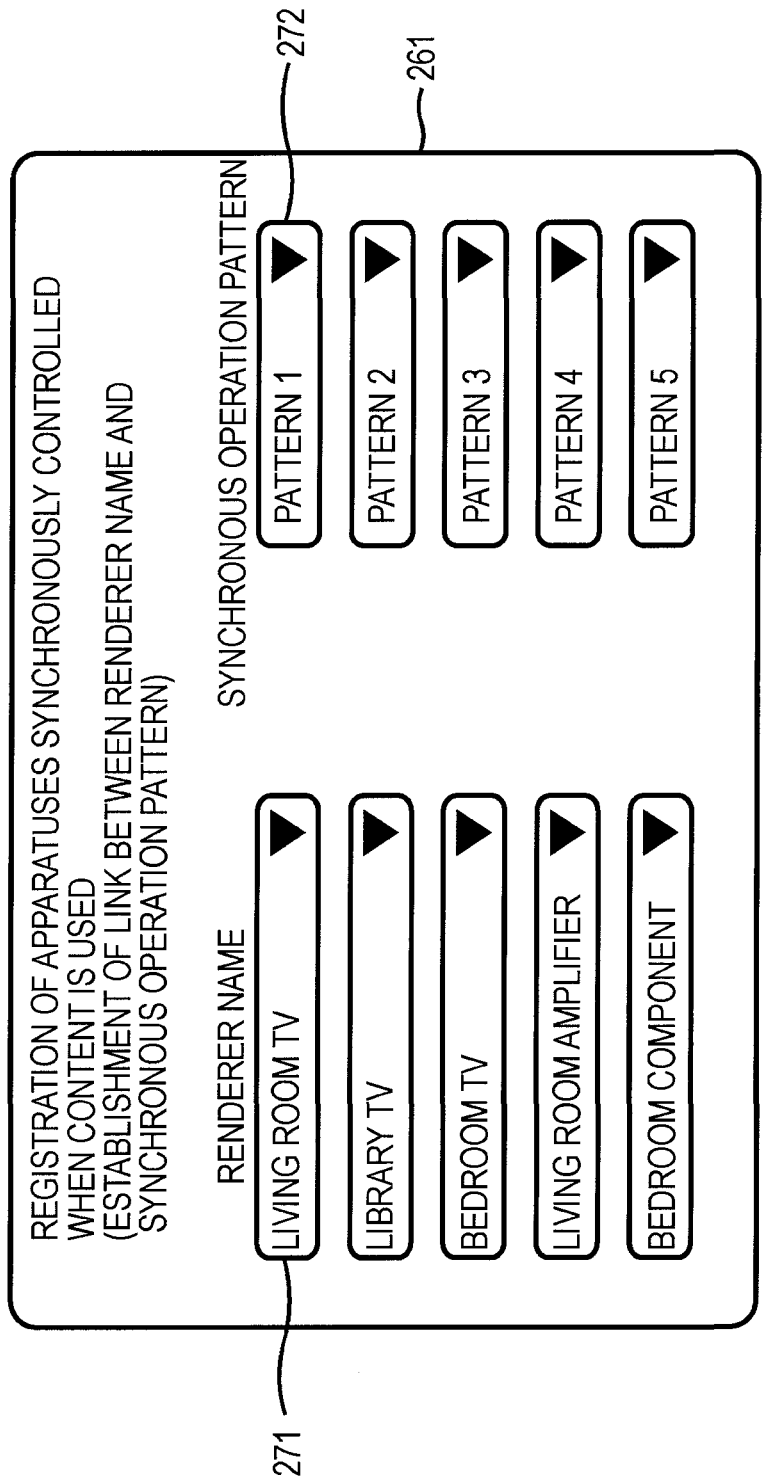
FIG. 13 is a diagram illustrating an example of a screen displayed on an LCD of a controller.

FIG. 13 is a diagram illustrating an example of a screen displayed on the LCD 39 of the controller 11 when a synchronous control condition is registered by associating the name of a renderer with a synchronous operation pattern.

When a synchronous control condition is registered by associating the name of a renderer with a synchronous operation pattern, renderer name selection buttons 271 each of which is used to select one of renderer names and synchronous operation pattern selection buttons 272 each of which is used to select one of synchronous operation patterns are arranged on a synchronously controlled apparatus registration screen 261 as shown in FIG. 13.

If one of the renderer name selection buttons 271 is operated, a menu allowing a user to select any one of renderer names, "living room TV", "library TV", "bedroom TV, "living room amplifier", and "bedroom component" is displayed. A user selects any one of the above-described names, "living room TV", "library TV", "bedroom TV, "living room amplifier", and "bedroom component", whereby one of these renderer names is selected.

For example, if pattern 1 is selected by one of the synchronous operation pattern selection buttons 272 corresponding to one of the renderer name selection buttons 271 by which "living room TV" is selected, a synchronous control condition is set by associating the renderer name "living room TV" with pattern 1. If pattern 2 is selected by one of the synchronous operation pattern selection buttons 272 corresponding to one of the renderer name selection buttons 271 by which "library TV" is selected, a synchronous control condition is set by associating the renderer name "library TV" with pattern 2. If pattern 3 is selected by one of the synchronous operation pattern selection buttons 272 corresponding to one of the renderer name selection buttons 271 by which "bedroom TV" is selected, a synchronous control condition is set by associating the renderer name "bedroom TV" with pattern 3. If pattern 4 is selected by one of the synchronous operation pattern selection buttons 272 corresponding to one of the renderer name selection buttons 271 by which "living room amplifier" is selected, a synchronous control condition is set by associating the renderer name "living room amplifier" with pattern 4. If pattern 5 is selected by one of the synchronous operation pattern selection buttons 272 corresponding to one of the renderer name selection buttons 271 by which "bedroom component" is selected, a synchronous control condition is set by associating the renderer name "bedroom component" with pattern 5.

By performing the above-described setting operations, a synchronous operation pattern can be specified in accordance with the name of a selected renderer. Accordingly, apparatuses can be controlled in accordance with the specified synchronous operation pattern.

Here, information allowing identification of a renderer such as a renderer identification number may be used to specify a render instead of a renderer name.

Furthermore, the location of a renderer may be associated with a synchronous operation pattern.

Figure 14:
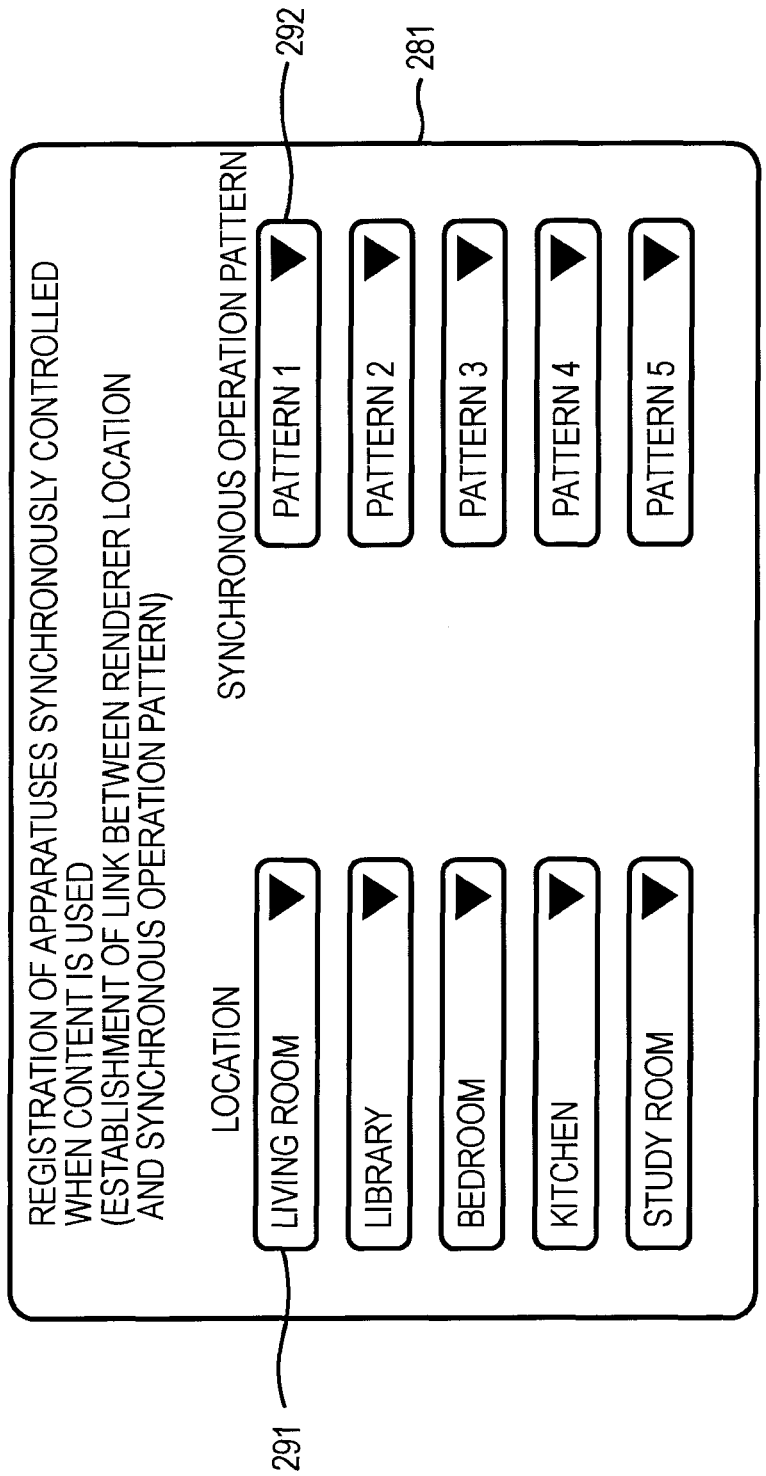
FIG. 14 is a diagram illustrating an example of a screen displayed on an LCD of a controller.

FIG. 14 is a diagram illustrating an example of a screen displayed on the LCD 39 of the controller 11 when a synchronous control condition is registered by associating the location of a renderer with a synchronous operation pattern.

When a synchronous control condition is registered by associating the location of a renderer with a synchronous operation pattern, renderer location selection buttons 291 each of which is used to select one of renderer locations and synchronous operation pattern selection buttons 292 each of which is used to select one of synchronous operation patterns are arranged on a synchronously controlled apparatus registration screen 281 as shown in FIG. 14.

If one of the renderer location selection buttons 291 is operated, a menu allowing a user to select any one of renderer locations, "living room", "library", "bedroom", "kitchen", and "study room" is displayed. A user selects any one of the above-described renderer locations, "living room", "library", "bedroom", "kitchen", and "study room", whereby one of these renderer locations is selected.

For example, if pattern 1 is selected by one of the synchronous operation pattern selection buttons 292 corresponding to one of the renderer location selection buttons 291 by which "living room" is selected, a synchronous control condition is set by associating the renderer location "living room" with pattern 1. If pattern 2 is selected by one of the synchronous operation pattern selection buttons 292 corresponding to one of the renderer location selection buttons 291 by which "library" is selected, a synchronous control condition is set by associating the renderer location "library" with pattern 2. If pattern 3 is selected by one of the synchronous operation pattern selection buttons 292 corresponding to one of the renderer location selection buttons 291 by which "bedroom" is selected, a synchronous control condition is set by associating the renderer location "bedroom" with pattern 3. If pattern 4 is selected by one of the synchronous operation pattern selection buttons 292 corresponding to one of the renderer location selection buttons 291 by which "kitchen" is selected, a synchronous control condition is set by associating the renderer location "kitchen" with pattern 4. If pattern 5 is selected by one of the synchronous operation pattern selection buttons 292 corresponding to one of the renderer location selection buttons 291 by which "study room" is selected, a synchronous control condition is set by associating the renderer location "study room" with pattern 5.

By performing the above-described setting operations, a synchronous operation pattern can be specified in accordance with the location of a selected renderer. Accordingly, apparatuses can be controlled in accordance with the specified synchronous operation pattern.

In this case, the renderer profile information acquisition unit 82 acquires profile information (a renderer name, a renderer location, etc.) on a renderer such as the television set 12 via the network interface 81. The synchronous control pattern specifying unit 83 specifies a synchronous control pattern on the basis of synchronous operation patterns and synchronous control conditions which have been supplied from the synchronous control information registration unit 88 and the profile information supplied from the renderer profile information acquisition unit 82.

As shown in FIG. 15, a renderer name is, for example, "living room TV", "library TV", "bedroom TV", living room amplifier", or "bedroom component". A renderer for reproducing a corresponding content item (apparatuses to be synchronously controlled) is specified on the basis of a renderer name indicated by profile information on a selected renderer.

Furthermore, a renderer location is, for example, "living room", "library", or "bedroom". A renderer for reproducing a corresponding content item (apparatuses to be synchronously controlled) is specified on the basis of a renderer location indicated by profile information on a selected renderer.

Thus, synchronous operation patterns are individually associated with renderer names or renderer locations, and are then registered. Accordingly, apparatuses can be controlled on the basis of a synchronous operation pattern corresponding to the name or location of a renderer that has been selected as a renderer for reproducing a corresponding content item. Like the above-described case, a plurality of apparatuses can be synchronously controlled by a simpler operation.

Furthermore, a renderer may transmit a control command to another apparatus.

Figure 16:
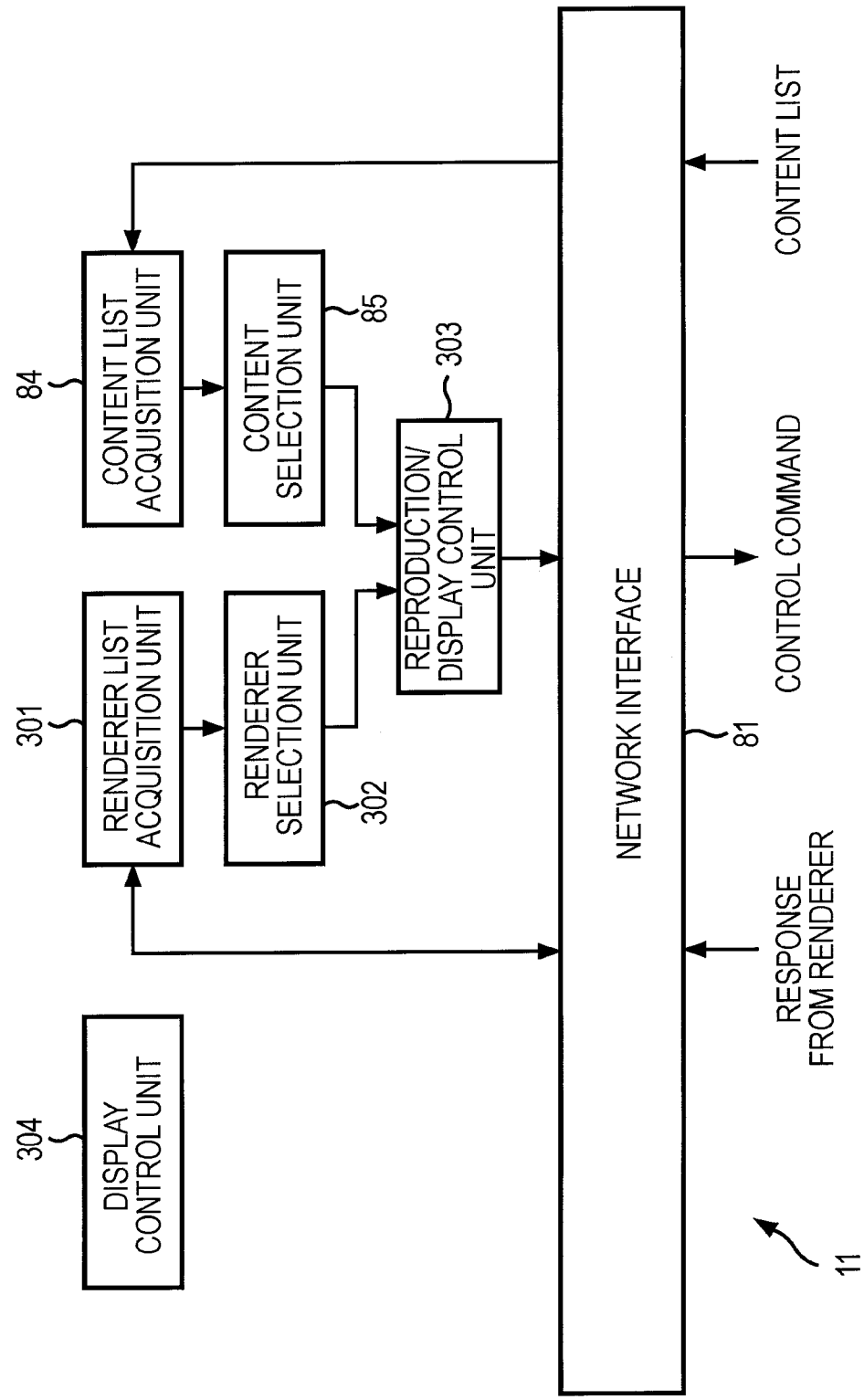
FIG. 16 is a block diagram illustrating an exemplary functional configuration of a controller for executing a program.

FIG. 16 is a block diagram illustrating an exemplary functional configuration of the controller 11 for executing a program when the television set 12, which is a renderer, transmits a control command to another apparatus. In FIG. 16, the same reference numerals are used for components having the same functions as those of FIG. 3, and the description thereof will be therefore omitted.

A renderer list acquisition unit 301 acquires a list of other apparatuses that are renderers via the network interface 81, and supplies the acquired list of other apparatuses that are renderers to a renderer selection unit 302.

The renderer selection unit 302 causes the LCD 39 to display the renderer list acquired by the renderer list acquisition unit 301, selects one of the renderers included in the displayed renderer list on the basis of a signal corresponding to a user's operation which has been transmitted from the input switch matrix unit 32, and supplies information on the selected renderer to a reproduction/display control unit 303.

The content selection unit 85 supplies information on a selected content item and information on the attribute of the selected content item to the reproduction/display control unit 303.

The reproduction/display control unit 303 transmits a request for reproduction of the selected content item to the selected renderer via the network interface 81.

Here, a display control unit 304 may control the display of a content list or a renderer list on the LCD 39.

Figure 17:
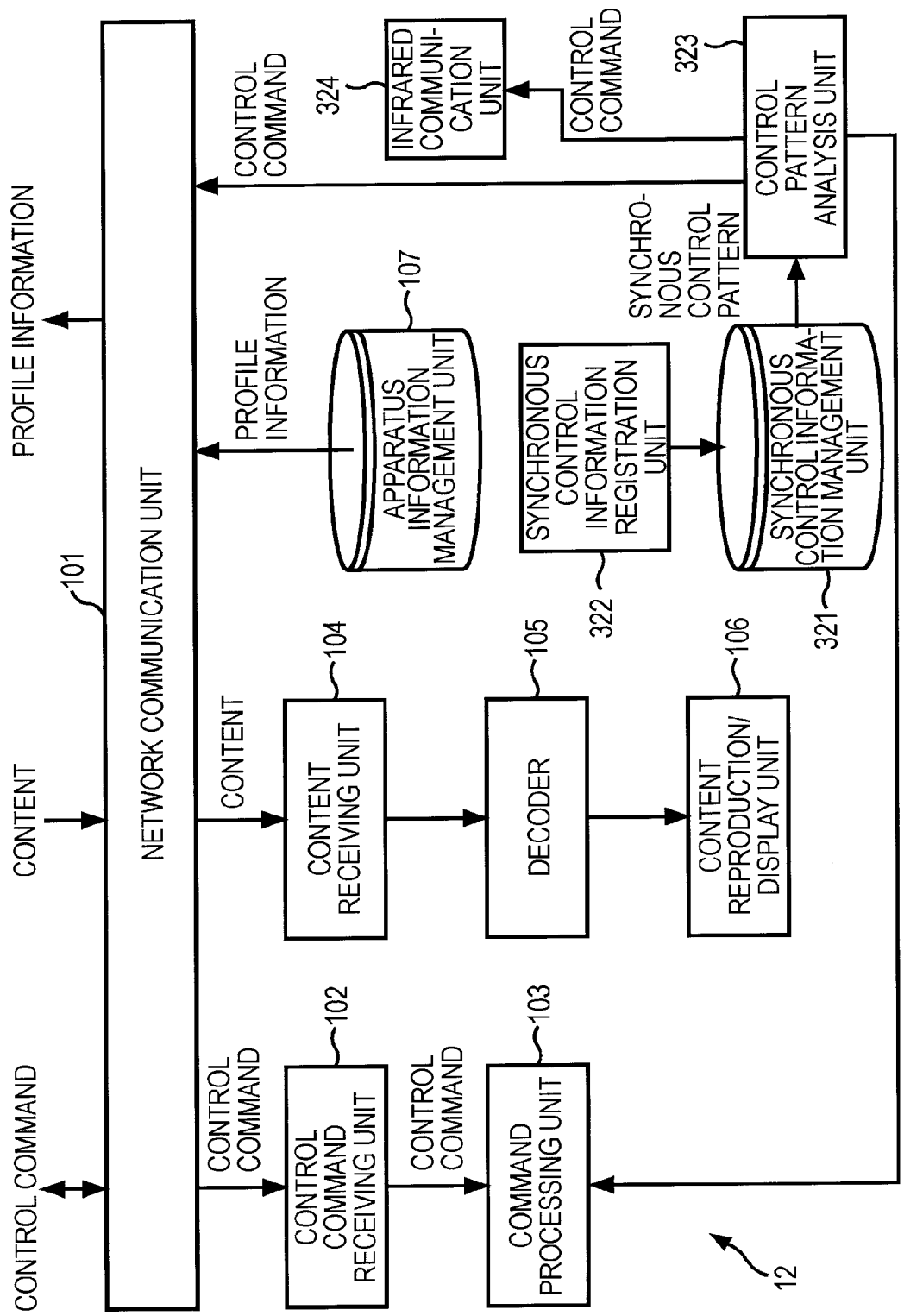
FIG. 17 is a block diagram illustrating an exemplary configuration of a television set.

FIG. 17 is a block diagram illustrating an exemplary configuration of the television set 12 when the television set 12, which is a renderer, transmits a control command to another apparatus. In FIG. 17, the same reference numerals are used for components having the same functions as those of FIG. 4, and the description thereof will be therefore omitted.

A synchronous control information management unit 321 stores synchronous control information used to synchronously control apparatuses. A synchronous control information registration unit 322 causes the synchronous control information management unit 321 to store the synchronous control information. A control pattern analysis unit 323 analyzes a synchronous control pattern read out from the synchronous control information management unit 321, sequentially generates control commands each used to control the operation of an apparatus on the basis of the analysis result, and supplies the generated control commands to the network communication unit 101 or an infrared communication unit 324. Furthermore, the control pattern analysis unit 323 analyzes the synchronous control pattern read out from the synchronous control information management unit 321, sequentially generates control commands each used to control the operation of an apparatus on the basis of the analysis result, and supplies one of the generated control commands which is used to control the television set 12 to the command processing unit 103.

The network communication unit 101 transmits the control command to another apparatus via the network 20. The infrared communication unit 324 is compliant with the SIRCS standard that is an infrared communication standard, and transmits the control command supplied from the control pattern analysis unit 323 as an infrared command using infrared rays.

Figure 18:
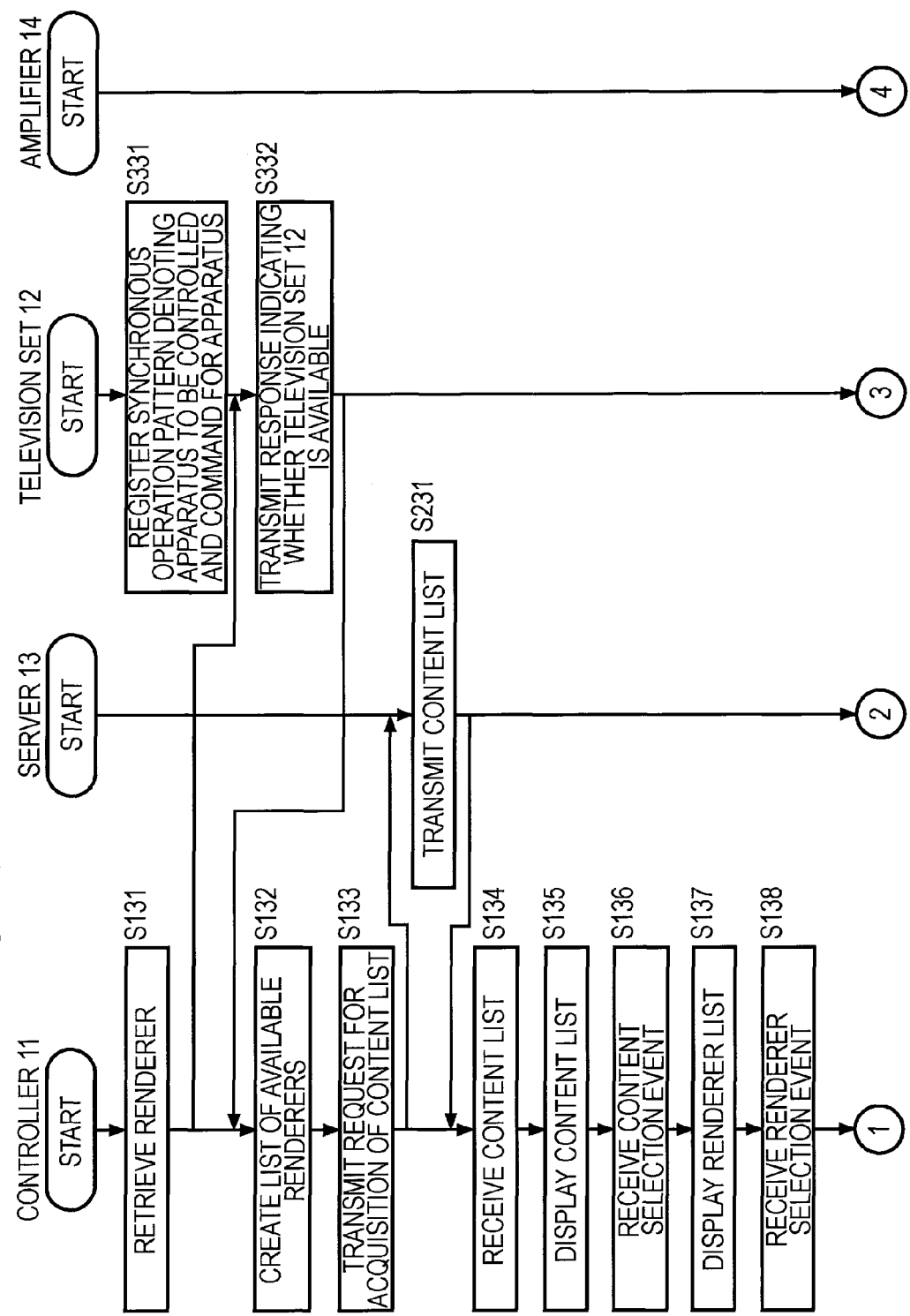
FIG. 18 is a flowchart describing a content reproduction process.
Figure 19:
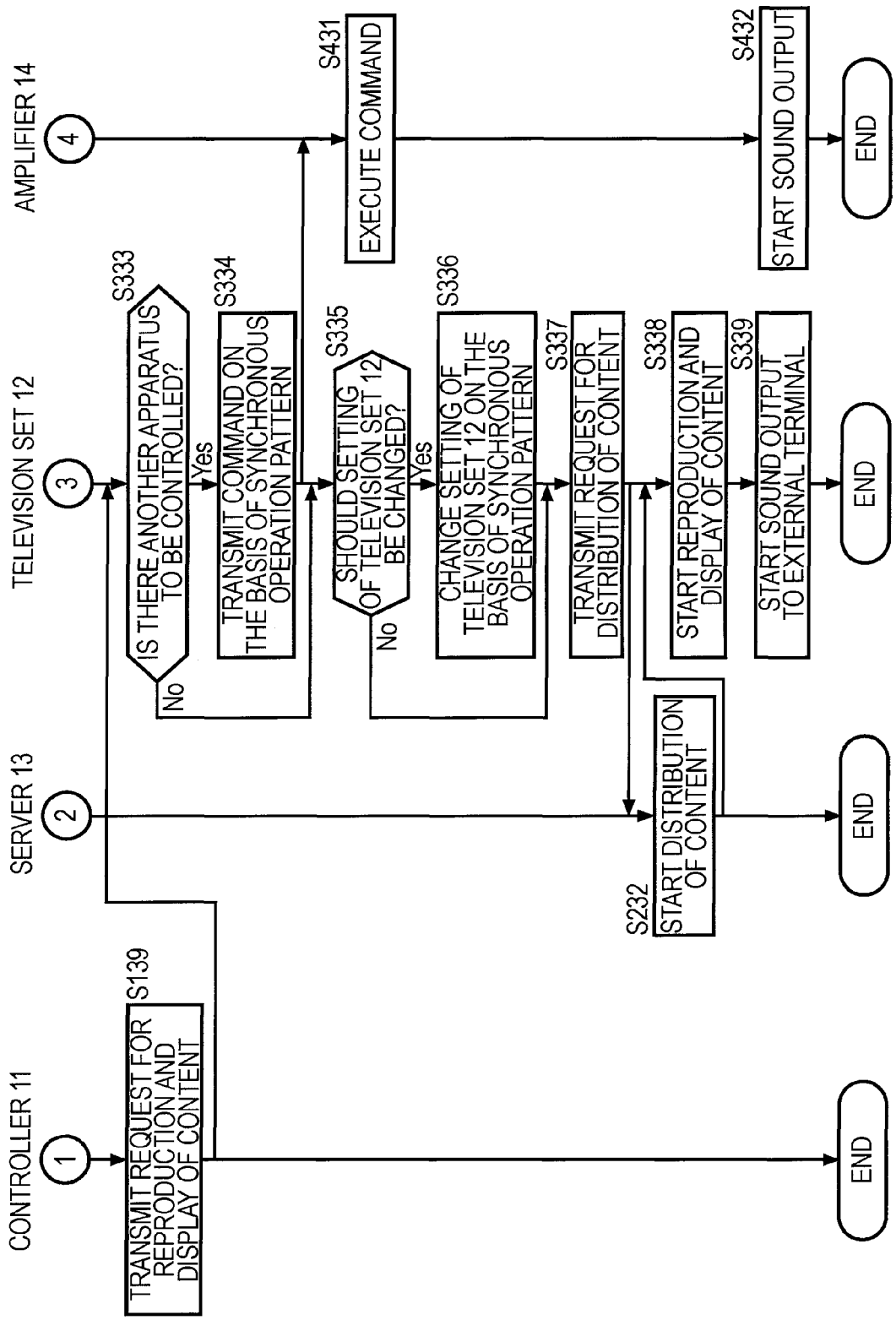
FIG. 19 is a flowchart describing the content reproduction process.

Next, another content reproduction process will be described in detail with reference to flowcharts shown in FIGS. 18 and 19.

In step S331, the synchronous control information registration unit 322 registers a synchronous operation pattern including pieces of information on apparatuses to be controlled and pieces of information on control commands in the synchronous control information management unit 321. The synchronous control information management unit 321 records the synchronous operation pattern in response to a registration request transmitted from the synchronous control information registration unit 322. That is, the synchronous control information registration unit 322 registers pieces of information on apparatuses that are required to be controlled when a content item is reproduced and displayed and pieces of information on control commands used to control these apparatuses in the synchronous control information management unit 321. More specifically, for example, information on a control command for causing the amplifier 14 to select one of inputs acquired from the external output terminal of the television set 12 is associated with information on the amplifier 14 and is then registered as a synchronous operation pattern.

In step S131, the renderer list acquisition unit 301 included in the controller 11 performs renderer retrieval processing. For example, the renderer list acquisition unit 301 broadcasts an inquiry whether a corresponding render is available via the network 20.

In step S332, the apparatus information management unit 107 included in the television set 12, which is an example of a renderer, causes the network communication unit 101 to transmit a response indicating whether the television set 12 is available. That is, the network communication unit 101 transmits a response whether the television set 12 is available to the controller 11 via the network 20.

In step S132, the renderer list acquisition unit 301 included in the controller 11 receives the response indicating whether the television set 12 is available via the network interface 81 from the television set 13 that is a renderer, and creates a list of available renderers on the basis of the received response.

In step S133, the content list acquisition unit 84 included in the controller 11 transmits a request for acquisition of a content list of available content items to the server 13 via the network interface 81.

In step S231, the network interface 161 included in the server 13 transmits a content list of available content items to the controller 11 via the network 20 in response to the content list acquisition request transmitted from the controller 11.

In step S134, the content list acquisition unit 84 causes the network interface 81 to receive the content list transmitted from the server 13 via the network 20, acquires the content list from the network interface 81, and supplies the acquired content list to the content selection unit 85.

In step S135, the content selection unit 85 causes the LCD 39 to display the content list. More specifically, the content selection unit 85 supplies the content list to the GDP 38 so as to cause the GDP 38 to generate image data for the content list. The GDP 38 supplies the generated image data to the LCD 39 so as to cause the LCD 39 to display the content list.

In step S136, the content selection unit 85 receives a user's content item selection event in which a user selects one of content items included in the content list displayed in step S135. For example, the content selection unit 85 receives a user's content item selection event by receiving a signal corresponding to a user's content item selection operation from the input switch matrix unit 32. The content selection unit 85 supplies information on the selected content item to the reproduction/display control unit 303.

In step S137, the renderer selection unit 302 causes the LCD 39 to display the renderer list. More specifically, the renderer selection unit 302 supplies the renderer list to the GDP 38 so as to cause the GDP 38 to generate image data for the renderer list. The GDP 38 supplies the generated image data to the LCD 39 so as to cause the LCD 39 to display the renderer list.

In step S138, the renderer selection unit 302 receives a user's renderer selection event in which a user selects on of renderers included in the renderer list displayed in step S137. For example, the renderer selection unit 302 receives a user's renderer selection event by receiving a signal corresponding to a user's renderer selection operation from the input switch matrix unit 32. The renderer selection unit 302 supplies information on the selected renderer to the reproduction/display control unit 303.

Here, the display control unit 304 may control the display of the content list on the LCD 39 in step S135 and may control the display of the renderer list on the LCD 39 in step S137.

In step S139, the reproduction/display control unit 303 supplies a control command for causing the television set 12, which is the selected renderer, to reproduce and display the selected content item to the network interface 81. The network interface 81 causes the network communication unit 35 to transmit the control command for causing the television set 12 to reproduce and display the selected content item via the network 20.

In step S333, the control pattern analysis unit 323 reads out a synchronous operation pattern including pieces of information on apparatuses to be controlled and pieces of information on control commands from the synchronous control information management unit 321, and determines whether there is another apparatus to be controlled on the basis of the synchronous control pattern. If it is determined in step S333 that there is another apparatus to be controlled, the process proceeds to step S334. In step S334, the control pattern analysis unit 323 supplies a control command to the network communication unit 101 or the infrared communication unit 324 on the basis of the synchronous control pattern. The processing of the step S334 is repeated until it is determined that there is no apparatus to be controlled on the basis of the synchronous control pattern. More specifically, for example, in step S334, the infrared communication unit 324 transmits a control command for selecting one of inputs acquired from the external output terminal of the television set 12 to the amplifier 14 using infrared rays.

In step S431, the infrared receiving unit 121 included in the amplifier 14 receives infrared rays that have been transmitted from the television set 12 as a control command. The control command receiving unit 122 extracts a signal pattern corresponding to the control command from a signal supplied from the infrared receiving unit 121, thereby receiving the control command for selecting one of inputs acquired from the external output terminal of the television set 12. The command processing unit 123 executes the control command for selecting one of inputs acquired from the external output terminal of the television set 12, and controls each unit included in the amplifier 14. Consequently, the amplifier 14 selects one of inputs that have been input from an input terminal thereof connected to the external output terminal of the television set 12 via an AV cable. Accordingly, the amplifier 14 can amplify an audio signal that has been input from the input terminal thereof and cause the speaker 15 to output sound corresponding to the audio signal.

In step S335, the control pattern analysis unit 323 determines whether the setting of the television set 12 should be changed on the basis of the synchronous operation pattern including pieces of information on apparatuses to be controlled and pieces of information on control commands. If it is determined in step S335 that the setting of the television set 12 should be changed, the process proceeds to step S336. In step S336, the control pattern analysis unit 323 supplies a control command to the command processing unit 103 on the basis of the synchronous control pattern. The command processing unit 103 executes the control command supplied from the control pattern analysis unit 323, and controls each unit included in the television set 12. For example, in step S336, the control pattern analysis unit 323 supplies a control command for muting sound output from a built-in speaker to the command processing unit 103 on the basis of the synchronous control pattern. The command processing unit 103 executes the control command, and controls each unit included in the television set 12 so as to mute sound output from the built-in speaker.

If it is determined in step S335 that there is no need to change the setting of the television set 12, the processing of step S336 is skipped and the process proceeds to step S337.

Figure 9:
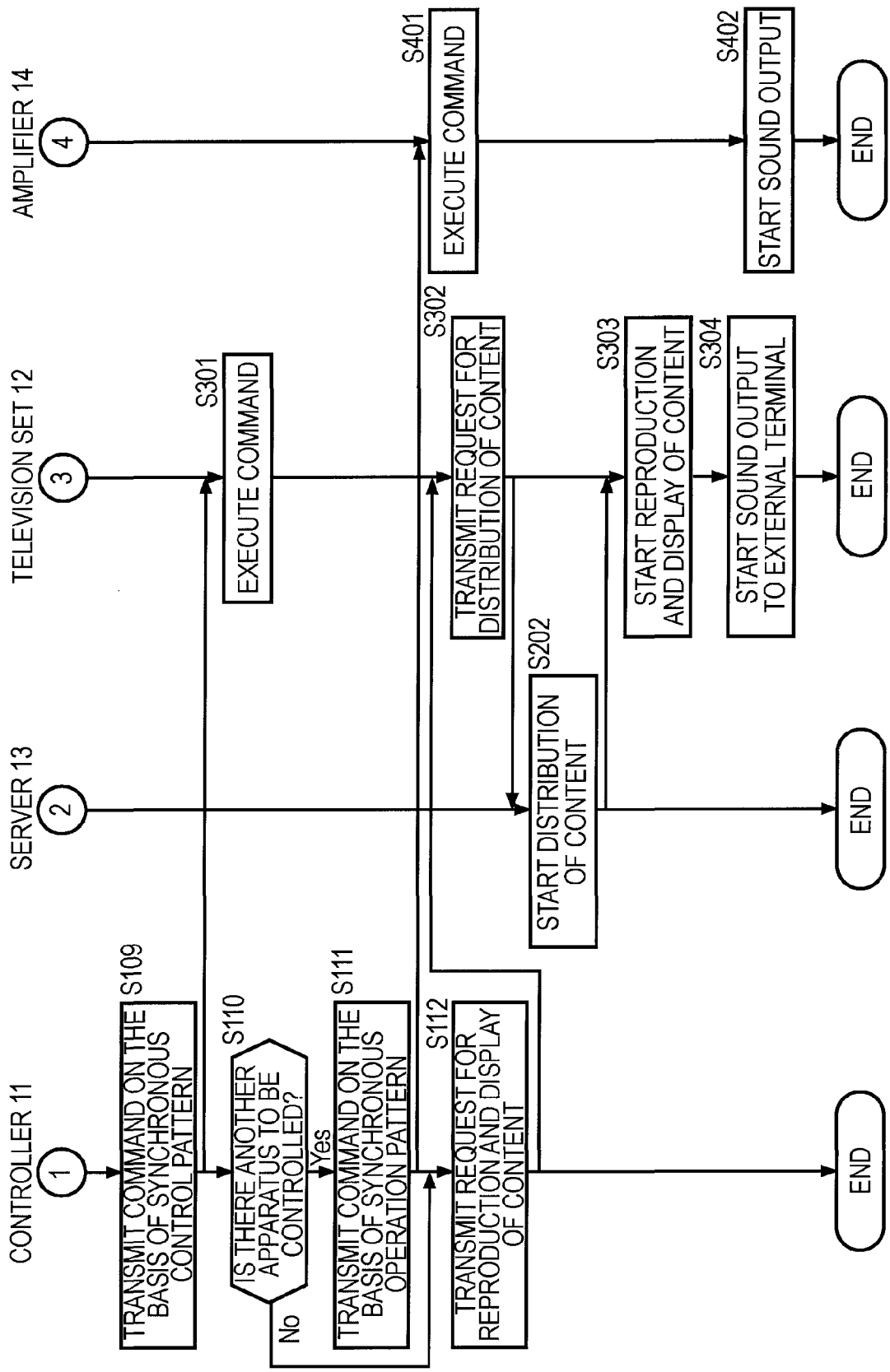
FIG. 9 is a flowchart describing the content reproduction process.

The processing operations of step S337, step S338, step S339, step S232, and step S432 are the same as those of step S302, step S303, step S304, step S202 and step S402 in FIG. 9, respectively. Accordingly, the description thereof will be omitted.

Thus, the television set 12 that transmits a content distribution request can control another apparatus. Accordingly, a plurality of apparatuses can be synchronously controlled by a simpler operation.

Here, a control command corresponding to an infrared command, which is a control command for which infrared rays are used, may be transmitted via a network. An apparatus that has received the control command may transmit an infrared command, that is, emit infrared rays as the infrared command.

Figure 20:
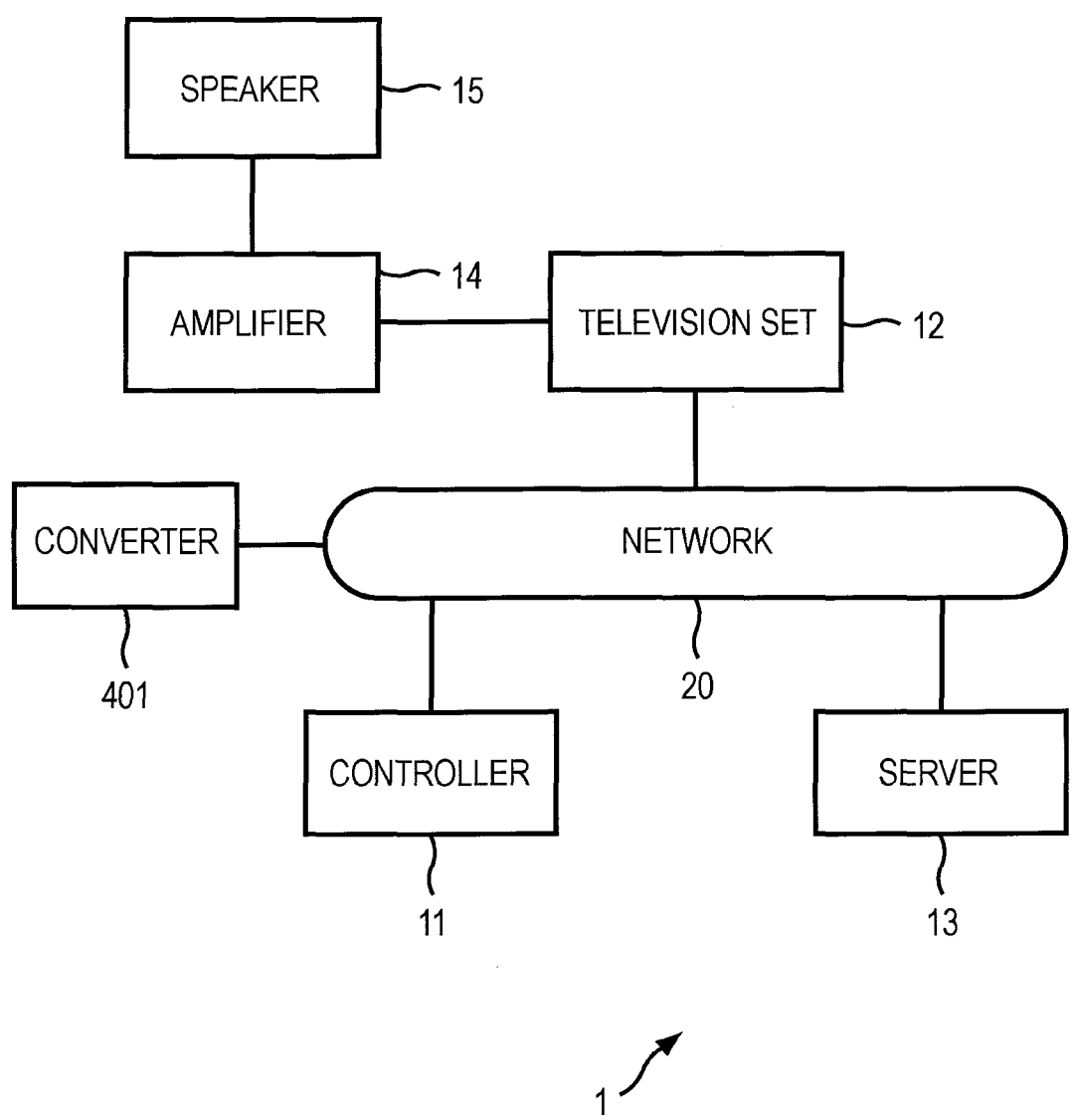
FIG. 20 is a block diagram illustrating another configuration of a reproduction system according to an embodiment of the present invention.

FIG. 20 is a block diagram illustrating another configuration of a reproduction system according to an embodiment of the present invention. In FIG. 20, the same reference numerals are used for components having the same functions as those of FIG. 1, and the description thereof will be therefore omitted as appropriate.

The controller 11 transmits a control command corresponding to an infrared command to a converter 401 via the network 20. Here, it is required that a single infrared command can be specified on the basis of the control command corresponding to an infrared command which is transmitted from the controller 11 to the converter 401 via the network 20. For example, the controller 11 transmits to the converter 401 via the network 20 a control command including a value that denotes a flashing pattern corresponding to an infrared command, a control command including an ID for specifying an infrared command, or a control command including data of a manufacturer, an apparatus, or an operation indicated by an infrared command as a control command corresponding to an infrared command.

The converter 401 receives the control command corresponding to an infrared command from the controller 11 via the network 20, and transmits an infrared command on the basis of the received control command. That is, the converter 401 emits infrared rays as an infrared command on the basis of the received control command.

The converter 401 may be produced as a dedicated apparatus, or may function as a part of another apparatus.

Figure 21:
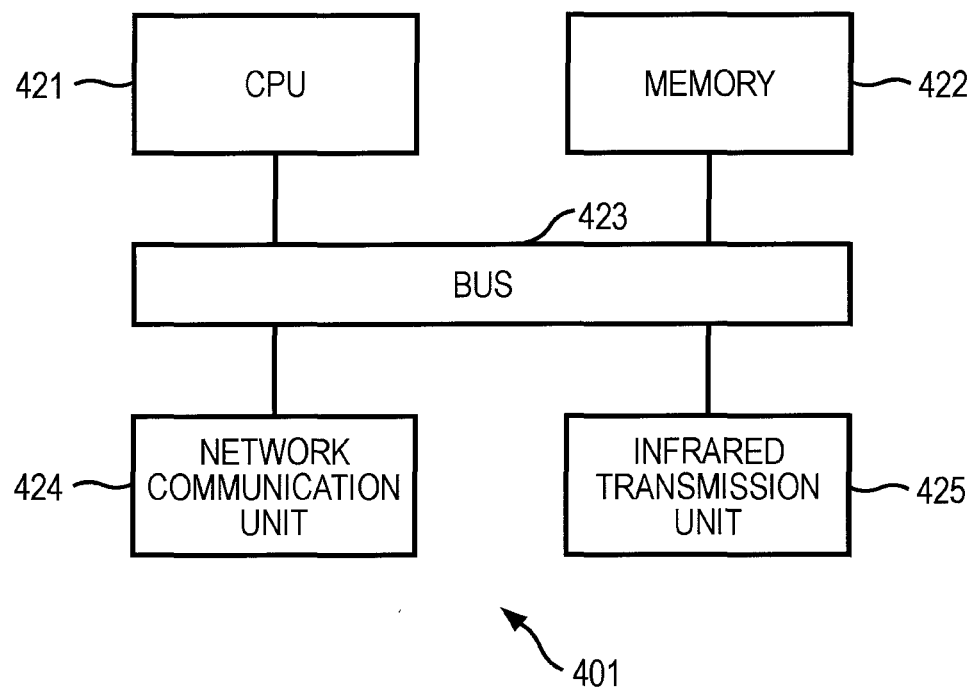
FIG. 21 is a block diagram illustrating an exemplary hardware configuration of a converter.

FIG. 21 is a block diagram illustrating an exemplary hardware configuration of the converter 401. The converter 401 is provided with a CPU 421, a memory 422, a bus 423, a network communication unit 424, and an infrared transmission unit 425.

The CPU 421 executes a program, and controls the whole of the converter 401. For example, the CPU 421 controls the whole of the converter 401 by decompressing a program stored on a ROM onto a RAM in the memory 422 and performing predetermined processing on the basis of the decompressed program.

The memory 422 is configured with a ROM or a RAM, and stores a program for executing the above-described processing flow and various pieces of data required for the execution of the program.

The CPU 421 and the memory 422 are connected to each other via the bus 423. Furthermore, the bus 423 is connected to the network communication unit 424 and the infrared transmission unit 425.

The network communication unit 424 communicates with another apparatus via the network 20 under the control of the CPU 421. For example, the network communication unit 424 communicates with the controller 11 via the network 20 that uses a wired or wireless medium. Unique identification information such as a MAC address used on the network 20 is set for the network communication unit 424.

The infrared transmission unit 425 transmits an infrared command that is a control command for which infrared rays are used under the control of the CPU 421. For example, the infrared transmission unit 425 transmits an infrared command compliant with the SIRCS standard, which is an infrared communication standard widely used for remote controllers for AV apparatuses, under the control of the CPU 421.

Figure 22:
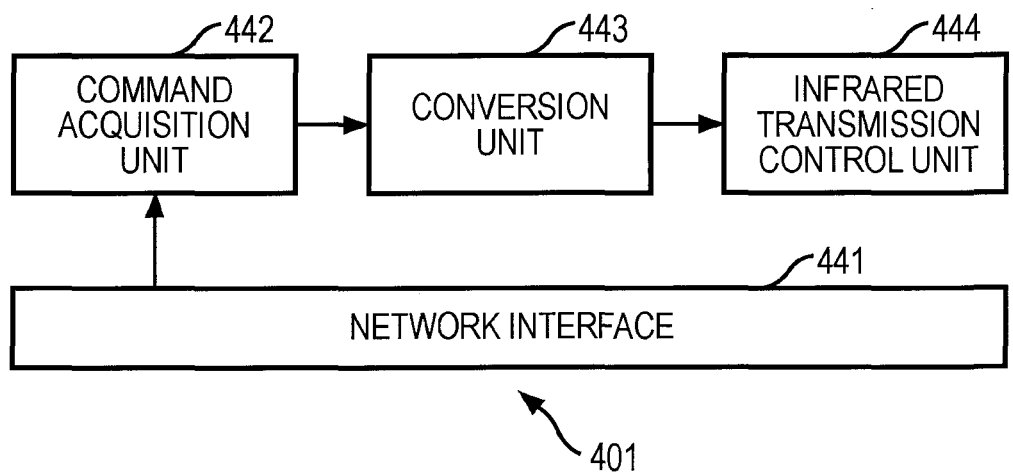
FIG. 22 is a block diagram illustrating an exemplary functional configuration of a converter.

FIG. 22 is a block diagram illustrating an exemplary functional configuration of the converter 401 for executing a program. The converter 401 executes a program, whereby a network interface 441, a command acquisition unit 442, a conversion unit 443, and an infrared transmission control unit 444 are achieved.

The network interface 441 controls the network communication unit 424 so as to control the connection between the network communication unit 424 and the network 20 and the communication between the network communication unit 424 and another apparatus via the network 20. The command acquisition unit 442 acquires a control command corresponding to an infrared command that has been transmitted from the controller 11 via the network 20 and the network interface 441, and supplies the acquired control command to the conversion unit 443.

The conversion unit 443 converts the control command supplied from the command acquisition unit 442 into an infrared command. That is, the conversion unit 443 converts the control command supplied from the command acquisition unit 442 into a signal that denotes a flashing pattern corresponding to an infrared command. The conversion unit 443 supplies the signal acquired by the conversion to the infrared transmission control unit 444.

The infrared transmission control unit 444 controls the infrared transmission unit 425. That is, the infrared transmission control unit 444 receives the signal denoting a flashing pattern from the conversion unit 443, and controls the infrared transmission unit 425 on the basis of the received signal so as to cause the infrared transmission unit 425 to transmit an infrared command corresponding to the flashing pattern.

Figure 23:
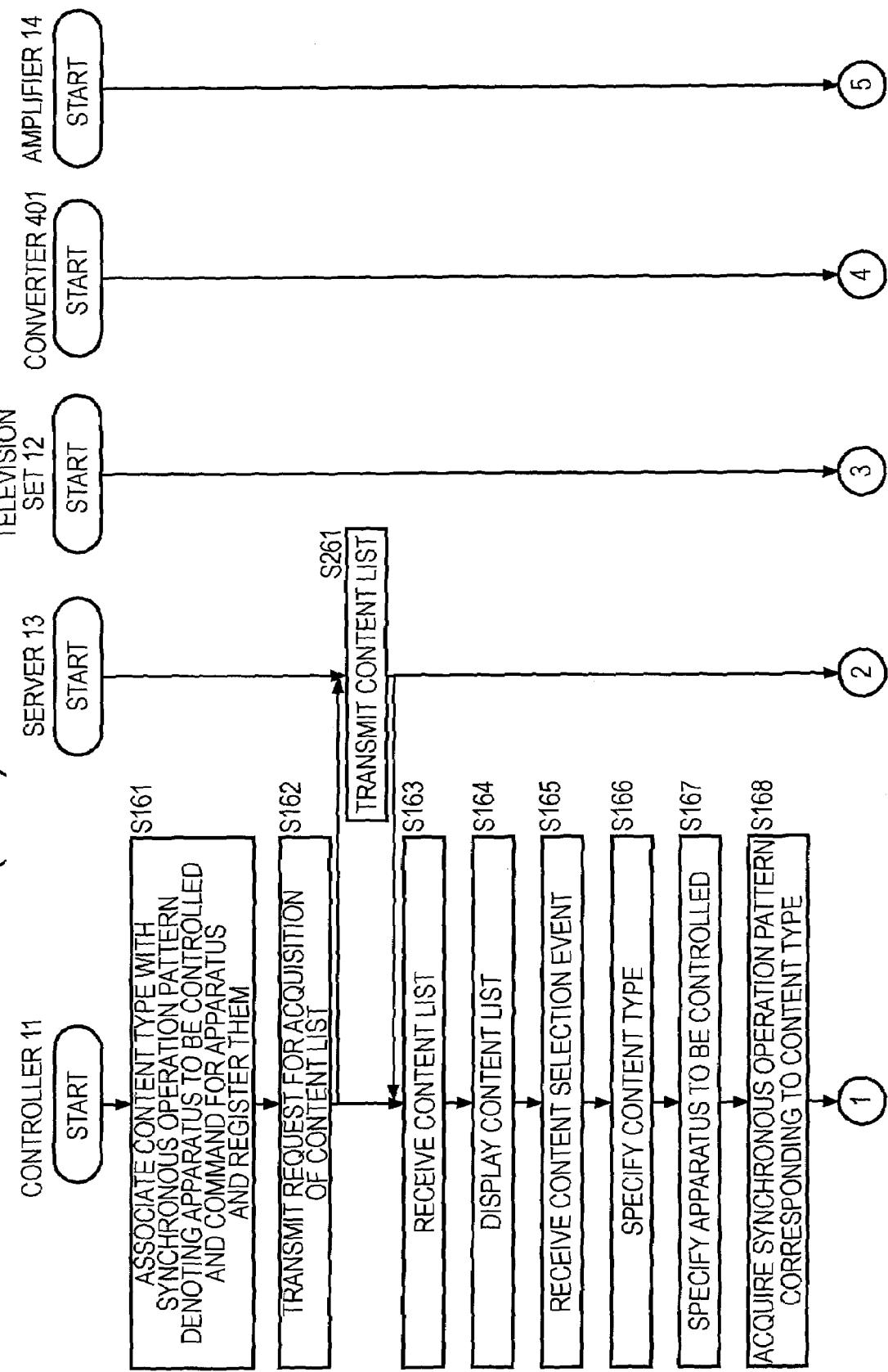
FIG. 23 is a flowchart describing another content reproduction process.
Figure 24:
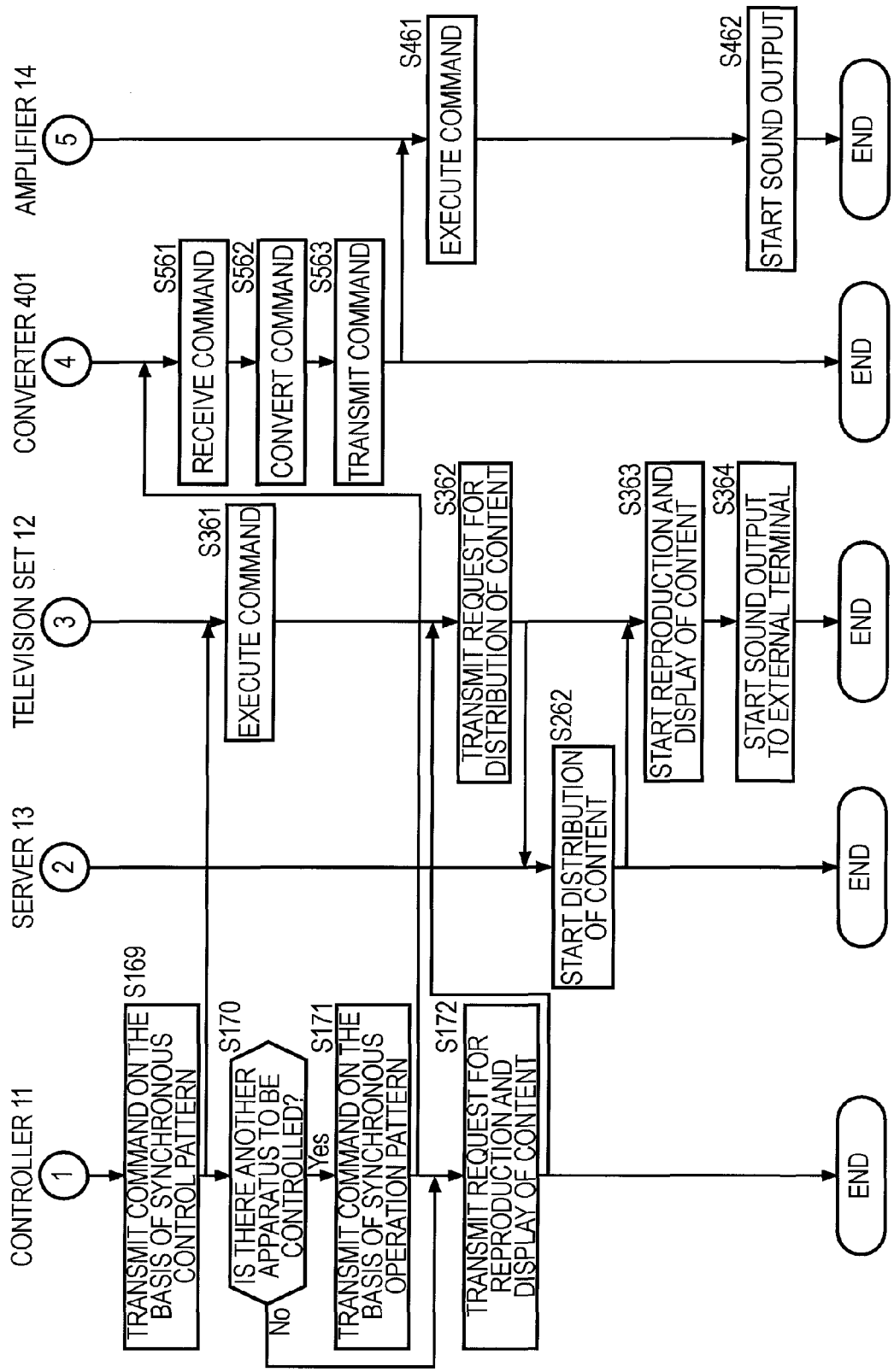
FIG. 24 is a flowchart describing another content reproduction process.

Next, another content reproduction process will be described with reference to flowcharts shown in FIGS. 23 and 24. The processing operations of step S161 to step S170 and step S361 are the same as those of step S101 to step S110 and step S301 in FIGS. 8 and 9, respectively, and the description thereof will be therefore omitted.

In step S171, the control pattern analysis unit 89 supplies a control command corresponding to an infrared command, which is a control command for which infrared rays are used, to the network interface 81 on the basis of a synchronous control pattern. The processing of step S171 is repeated until it is determined that there is no apparatus to be controlled on the basis of the synchronous control pattern. More specifically, for example, in step S171, the control pattern analysis unit 89 causes the network interface 81 to transmit to the converter 401 via the network 20 a control command that includes a value denoting a flashing pattern corresponding to an infrared command and that is used to cause the amplifier 14 to select one of inputs acquired from the external output terminal of the television set 12.

In step S561, the command acquisition unit 442 included in the converter 401 causes the network interface 441 to receive the control command corresponding to an infrared command which has been transmitted from the controller 11 via the network 20, and acquires the control command from the network interface 441. For example, the network interface 441 receives the control command for causing the amplifier 14 to select one of inputs acquired from the external output terminal of the television set 12, and supplies the received control command to the command acquisition unit 442. The command acquisition unit 442 supplies the acquired control command to the conversion unit 443.

In step S562, the conversion unit 443 converts the control command supplied from the command acquisition unit 442 into an infrared command. More specifically, for example, in step S562, the conversion unit 443 converts the control command supplied from the command acquisition unit 442 into a signal denoting a flashing pattern corresponding to an infrared command, thereby converting the control command transmitted form the controller 11 into an infrared command. The conversion unit 443 supplies the infrared command acquired by the conversion (the signal denoting a flashing pattern corresponding to an infrared command) to the infrared transmission control unit 444.

In step S563, the infrared transmission control unit 444 causes the infrared transmission unit 425 to transmit an infrared command. That is, the infrared transmission control unit 444 controls the infrared transmission unit 425 on the basis of the signal denoting the flashing pattern corresponding to an infrared command so as to cause the infrared transmission unit 425 to transmit an infrared command corresponding to the flashing pattern indicated by the signal. Thus, the infrared transmission unit 425 transmits an infrared command that is a control command for which infrared rays are used (emits infrared rays as a control command).

In step S461, the infrared receiving unit 121 included in the amplifier 14 receives infrared rays that have been transmitted from the converter 401 as a control command. The control command receiving unit 122 receives the control command. More specifically, the control command receiving unit 122 extracts a signal pattern corresponding to a control command from a signal supplied from the infrared receiving unit 121, thereby receiving the control command for selecting one of inputs acquired from the external output terminal of the television set 12.

The command processing unit 123 executes the received command and controls each unit included in the amplifier 14. For example, the command processing unit 123 executes the control command for selecting one of inputs acquired from the external output terminal of the television set 12, and controls each unit included in the amplifier 14.

Consequently, the amplifier 14 selects one of inputs acquired from an input terminal thereof connected to the external output terminal of the television set 12 via an AV cable. Accordingly, the amplifier 14 can amplify an audio signal that has been input from the input terminal thereof, and cause the speaker 15 to output sound corresponding to the audio signal.

The processing operations of step S172, step S362, step S363, step S364, step S262, and step S462 are the same as those of step S112, step S302, step S303, step S304, step S202, and step S402 in FIG. 9, respectively, and the description thereof will be therefore omitted.

Thus, according to the content reproduction process described with reference to FIGS. 23 and 24, predetermined control commands are individually transmitted to apparatuses registered in advance in accordance with the type of selected content item. Accordingly, a plurality of apparatuses can be synchronously controlled by a simpler operation. Furthermore, even if an apparatus for transmitting a control command via a network does not have a function of transmitting an infrared command, an apparatus that cannot be connected to the network can be controlled.

In a case where an apparatus for transmitting a control command via a network and an apparatus that will be controlled in accordance with the control command and cannot be connected to the network are apart from each other in different rooms or on different floors, if an apparatus for receiving the control command, converting the received control command into an infrared command, and transmitting the infrared command is disposed near the apparatus that cannot be connected to the network, the apparatus that cannot be connected to the network can be controlled.

Furthermore, a control command corresponding to an infrared command may be transmitted via a network, and an apparatus that has received the control command may emit infrared rays toward an infrared receiving portion for receiving an infrared command included in an apparatus to be controlled as an infrared command.

Figure 25:
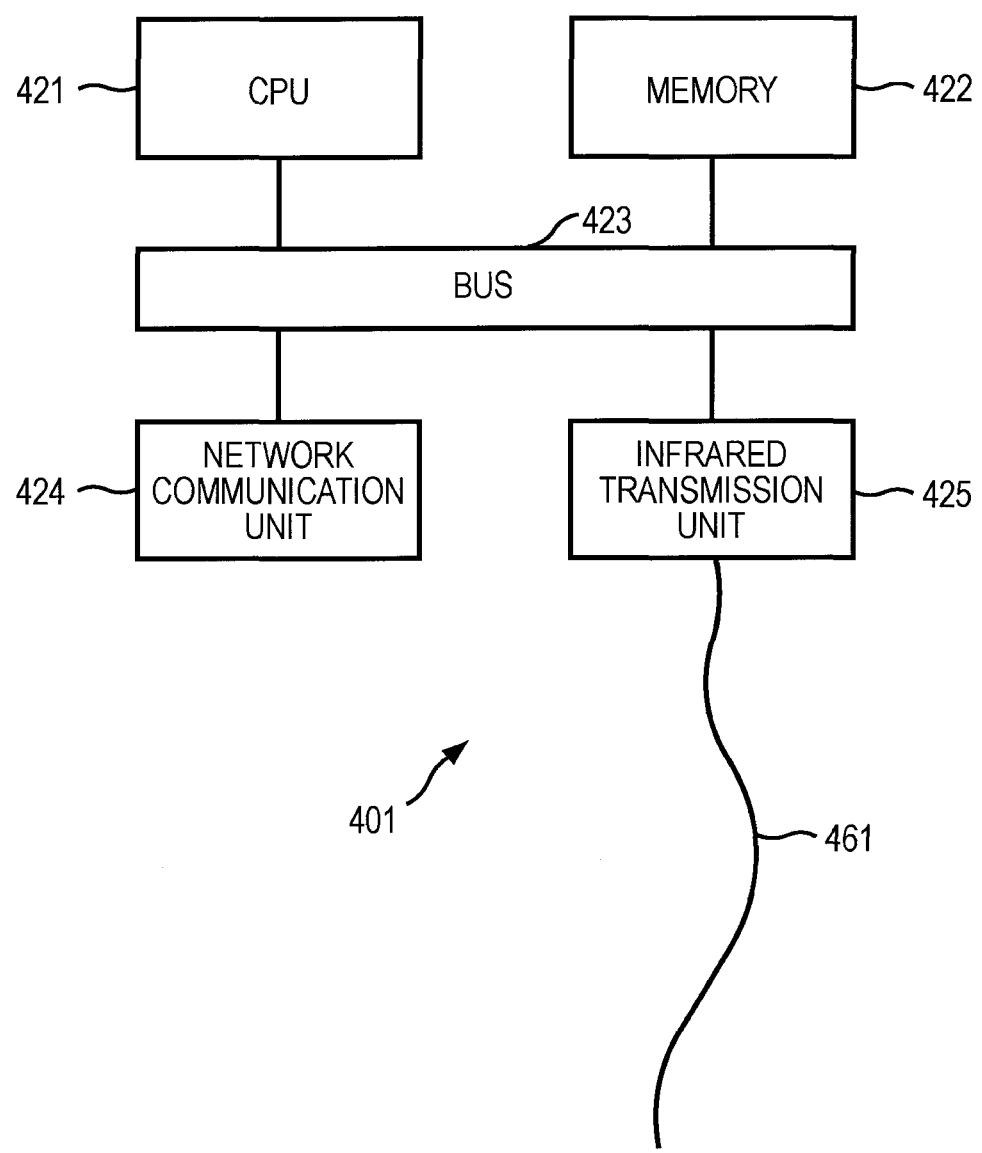
FIG. 25 is a block diagram illustrating another exemplary hardware configuration of a converter.

FIG. 25 is a block diagram illustrating another exemplary hardware configuration of the converter 401 for emitting infrared rays as an infrared command toward an infrared receiving portion of an apparatus to be controlled. In FIG. 25, the same reference numerals are used for components having the same functions as those of FIG. 21, and the description thereof will be therefore omitted. An optical fiber 461 is made of a light guiding material such as glass or plastic, and transfers infrared rays from one end thereof to the other end thereof.

On end of the optical fiber 461 is connected to an infrared emitting portion included in the infrared transmission unit 425. The other end of the optical fiber 461 is disposed near an infrared receiving portion for receiving an infrared command included in the amplifier 14, which is an example of an apparatus to be controlled, so that infrared rays emitted from the other end of the optical fiber 461 can be received by the infrared receiving portion of the amplifier 14.

Infrared rays emitted from the infrared transmission unit 425 as an infrared command is transferred from one end of the optical fiber 461 to the other end of the optical fiber 461. The infrared rays output from the other end of the optical fiber 461 is input into the infrared receiving portion of the amplifier 14 as an infrared command.

Thus, infrared rays are emitted toward an infrared receiving portion of an apparatus to be controlled as an infrared command. Accordingly, even if there is significant interference, that is, for example, even if an apparatus to be controlled is disposed by a window and is exposed to sunlight through the window, the apparatus to be controlled can be controlled with certainty.

Figure 26:
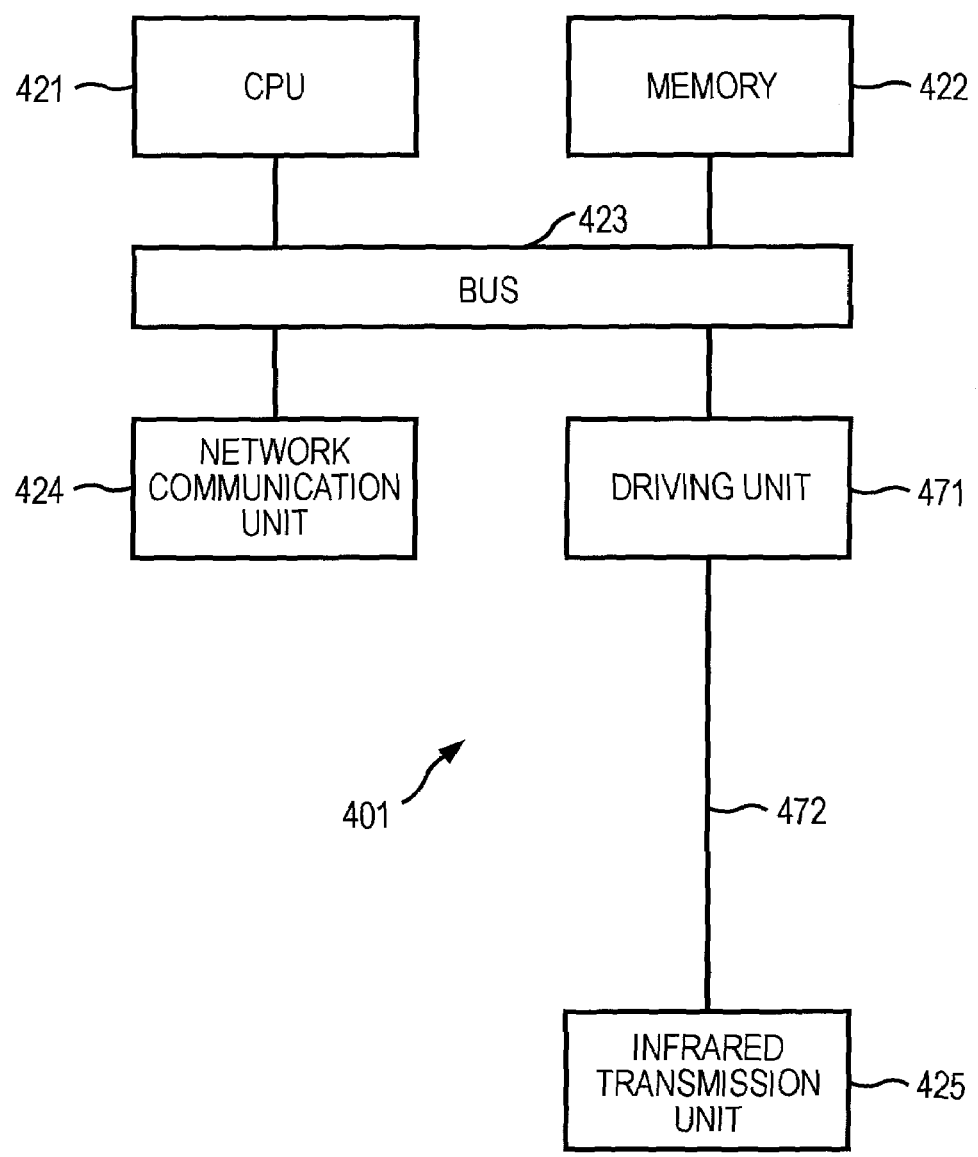
FIG. 26 is a block diagram illustrating still another exemplary hardware configuration of a converter.

FIG. 26 is a block diagram illustrating still another exemplary hardware configuration of the converter 401 for emitting infrared rays toward an infrared receiving portion of an apparatus to be controlled as an infrared command. In FIG. 26, the same reference numerals are used for components having the same functions as those of FIG. 21, and the description thereof will be therefore omitted. A driving unit 471 amplifies a voltage signal output form the bus 423, or outputs a current signal having a predetermined value which corresponds to a signal output from the bus 423. A signal output from the driving unit 471 is supplied to the infrared transmission unit 425 via a cable 472 that is a conductor.

Even if the cable 472 is long, a signal for causing the infrared transmission unit 425 to output an infrared command can be accurately transmitted to the infrared transmission unit 425 with certainty by the driving unit 471. Accordingly, infrared rays can be emitted as an infrared command with certainty.

If the cable 472 is short, the driving unit 471 may not be disposed.

The infrared transmission unit 425 included in the converter 401 shown in FIG. 26 is disposed near an infrared receiving portion for receiving an infrared command which is included in the amplifier 14.

Consequently, infrared rays are emitted towards an infrared receiving portion of an apparatus to be controlled as an infrared command. Accordingly, even if there is significant interference, that is, for example, even if an apparatus to be controlled is disposed by a window and is exposed to sunlight through the window, the apparatus to be controlled can be controlled with certainty.

In the above-described description, the converter 401 transmits an infrared command. However, the converter 401 may transmit a predetermined control command to an apparatus to be controlled through a path different from the network 20 using a wired or wireless medium. For example, a wired communication interface compliant with the RS-232-C, RS-422-A, or USB (Universal Serial Bus) standard may be disposed in the converter 401 instead of the infrared transmission unit 425 or in addition to the infrared transmission unit 425. In this case, the converter 401 may transmit a predetermined control command to an apparatus to be controlled using a wired medium. Alternatively, for example, a wireless communication interface compliant with the Bluetooth standard or the like may be disposed in the converter 401 instead of the infrared transmission unit 425 or in addition to the infrared transmission unit 425. In this case, the converter 401 may transmit a predetermined command to an apparatus to be controlled using a wireless medium.

In the above-described description, the controller 11 transmits a control command. However, an apparatus (renderer) such as the television set 12 may transmit a control command to the converter 401 via the network 20. In this case, the converter 401 may convert the control command transmitted from the apparatus (renderer) such as the television set 12 into an infrared command, and transmit the infrared command acquired by the conversion.

The above-described processing flow may be performed by pieces of hardware each having a function or software. If the processing flow is performed by software, a program configuring the software is installed from a recording medium on a computer embedded in a piece of dedicated hardware or, for example, on a general-purpose personal computer that is allowed to perform various functions by installing various programs thereon.

As shown in FIG. 2 or 6, a recording medium includes a package medium such as a removable medium attached to the storage device 41 or the recording unit 143. A package medium and a personal computer are separately provided to a user, and a package medium is used to provide a program to a user. In addition, a recording medium includes a hard disk containing the memory 34, the memory 142, or the recording unit 143 that stores a program. The hard disk is embedded in a computer in advance and is then provided to a user.

In this description, steps describing a program acquired from a recording medium do not have to be executed in chronological order described above. The steps may be concurrently or individually.

In this description, a system denotes an entire apparatus composed of a plurality of devices.

The invention claimed is:

1. A control apparatus, comprising:
   circuitry configured to
   control storage of a plurality of commands used to control a plurality of apparatuses that operate when a content is reproduced on at least one of the plurality of apparatuses,
   associate a type of the content with a certain group of the plurality of commands, the type of the content being one of a photograph, music, a video, a television broadcast, or a game,
   determine the type of the content in response to a selection of the content,
   determine specific ones of the plurality of apparatuses and the certain group of the plurality of commands based on the determined type of the content, and
   control a transmission of the selected certain group of the plurality of commands to the determined specific ones of the plurality of apparatuses.

2. The control apparatus according to claim 1, wherein the circuitry is further configured to update the association between the type of the content and the certain group of the plurality of commands each time an attribute of the type of the content is changed.

3. The control apparatus according to claim 1, wherein the plurality of commands stored by the circuitry is updated when a predetermined attribute of the at least one of the plurality of apparatuses that reproduces the content with the plurality of commands is changed.

4. The control apparatus according to claim 3, wherein the predetermined attribute of the at least one of the plurality of apparatuses is a name or location of the at least one of the plurality of apparatuses.

5. The control apparatus according to claim 1, wherein the circuitry is further configured to control the transmission of the plurality of commands via a network.

6. The control apparatus according to claim 5, wherein the circuitry is further configured to control the transmission of the plurality of commands to an apparatus for converting the plurality of commands transmitted via the network into infrared commands.

7. The control apparatus according to claim 6, wherein the circuitry is further configured to control the transmission of the infrared commands.

8. The control apparatus according to claim 1, wherein the circuitry is further configured to:
    acquire information regarding content currently available for a reproduction on the at least one of the plurality of apparatuses; and
    control display on the control apparatus of the information regarding currently available content, wherein the content is selected in response to a display of the information regarding the currently available content.

9. The control apparatus according to claim 8, wherein the circuitry is further configured to transmit the information corresponding to which of the plurality of apparatuses are selected to reproduce the content.

10. The control apparatus according to claim 1, wherein the circuitry is further configured to:
    control display of the plurality of apparatuses that are determined to be currently available; and
    receive a selection of the displayed currently available apparatuses to reproduce the content, wherein an inquiry is transmitted to the plurality of apparatuses to inquire whether each of the plurality of apparatuses are currently available to reproduce the content and the plurality of apparatuses which are currently available to reproduce the content is determined based upon a response to the inquiry.

11. The control apparatus according to claim 1, wherein the circuitry is further configured to:
    reproduce the content.

12. The control apparatus according to claim 11, wherein the circuitry is further configured to:
    control reproduction on the basis of one of the plurality of commands.

13. The control apparatus according to claim 1, wherein the processing circuitry is further configured to control the transmission of the selected commands to the plurality of apparatuses such that a command for a third apparatus is executed after a delay with respect to the selected commands executed for the at least two apparatuses.

14. The control apparatus according to claim 13, wherein the processing circuitry is further configured to control the transmission of the selected commands to the plurality of apparatuses such that the selected commands for a light and a television are executed substantially simultaneously and the command for an amplifier is executed after the delay.

15. A control method, implemented on a control apparatus, comprising:
    controlling, at a storage unit, a storage of a plurality of commands used to control a plurality of apparatuses that operate when a content is reproduced on at least one of the plurality of apparatuses;
    associating a type of the content with a certain group of the plurality of commands, the type of the content being one of a photograph, music, a video, a television broadcast, or a game;
    determining the type of the content in response to a selection of the content;
    determining specific ones of the plurality of apparatuses and the certain group of the plurality of commands based on the type of the content;
    and
    controlling a transmission of the selected certain group of the plurality of commands to the determined specific ones of the plurality of apparatuses.

16. A non-transitory computer readable storage medium including computer executable instructions, where the instructions, when executed by a processor, cause the processor to perform a method comprising:
    controlling a storage of a plurality of commands used to control a plurality of apparatuses that operate when a content is reproduced on at least one of the plurality of apparatuses;
    associating a type of the content with a certain group of the plurality of commands, the type of the content being one of a photograph, music, a video, a television broadcast, or a game;
    determining the type of the content in response to a selection of the content;
    determining specific ones of the plurality of apparatuses and the certain group of the plurality of commands based on the type of the content;
    and
    controlling a transmission of the selected certain group of the plurality of commands to the determined specific ones of the plurality of apparatuses.

* * * * *